United States Patent
Tashima et al.

[19]
[11] Patent Number: 6,166,131
[45] Date of Patent: Dec. 26, 2000

[54] HIGHLY REACTIVE MODIFIED PHENOLIC RESIN AND MOLDING MATERIAL FOR ELECTRICAL/ELECTRONIC PARTS AND SEMICONDUCTOR SEALING MATERIAL

[75] Inventors: Masao Tashima; Hiromi Miyasita; Haruhiko Takeda; Tomoaki Fujii; Tatsushi Ishizuka; Makoto Hasegawa, all of Kamisu-machi, Japan

[73] Assignee: Kashima Oil Co., Ltd., Tokyo, Japan

[21] Appl. No.: 09/401,491

[22] Filed: Sep. 22, 1999

Related U.S. Application Data

[62] Division of application No. 09/024,454, Feb. 17, 1998.

[30] Foreign Application Priority Data

| | | | |
|---|---|---|---|
| Feb. 18, 1997 | [JP] | Japan | 9-33812 |
| Mar. 11, 1997 | [JP] | Japan | 9-56557 |
| Sep. 26, 1997 | [JP] | Japan | 9-262339 |
| Sep. 29, 1997 | [JP] | Japan | 9-264142 |
| Nov. 28, 1997 | [JP] | Japan | 9-328199 |

[51] Int. Cl.⁷ ............ C08G 63/48; C08G 63/91
[52] U.S. Cl. ............ 525/54.5; 524/59; 524/65; 524/66; 528/129; 530/203; 530/204; 530/210; 530/211; 530/266
[58] Field of Search ............ 525/54.5; 530/203, 530/204, 210, 211, 226; 524/59, 65, 66; 528/129

[56] References Cited

U.S. PATENT DOCUMENTS

| | | | |
|---|---|---|---|
| 4,187,369 | 2/1980 | Pavlikov et al. | 528/137 |
| 5,432,240 | 7/1995 | Tsumura et al. | 525/389 |
| 5,484,854 | 1/1996 | Tsumura et al. | 525/486 |
| 5,521,259 | 5/1996 | Tsumura et al. | 525/481 |
| 5,614,600 | 3/1997 | Tsumura et al. | |
| 5,792,826 | 8/1998 | Tuashima et al. | 528/160 |
| 5,936,010 | 8/1999 | Tashima et al. | |

FOREIGN PATENT DOCUMENTS

| | | |
|---|---|---|
| 612 776 | 8/1994 | European Pat. Off. . |
| 665 249 | 8/1995 | European Pat. Off. . |

OTHER PUBLICATIONS

Patent Abstracts of Japan, JP 61–235413, Oct. 20, 1986.
Patent Abstracts of Japan, JP 2–274714, Nov. 8, 1990.
Patent Abstracts of Japan, JP 4–145116, May 19, 1992.
Patent Abstracts of Japan, JP 6–228257, Aug. 16, 1994.
Patent Abstracts of Japan, JP 7–252339, Oct. 3, 1995.
Patent Abstracts of Japan, JP 9–216927, Aug. 19, 1997.
Patent Abstracts of Japan, vol. 097, No. 006, Jun. 30, 1997, JP 09 031435, Feb. 4, 1997.
Patent Abstracts of Japan, vol. 097, No. 011, Dec. 26, 1995, JP 07 196766, Aug. 1, 1995.
Patent Abstracts of Japan, vol. 097, No. 006, Jun. 30, 1997, JP 09 031408, Feb. 4, 1997.
Patent Abstracts of Japan, vol. 095, No. 005, Jun. 30, 1995, JP 07 052352, Feb. 25, 1995.

*Primary Examiner*—Nathan M. Nutter
*Attorney, Agent, or Firm*—Oblon, Spivak, McClelland, Maier & Neustadt, P.C.

[57] ABSTRACT

Disclosed is a process for producing a highly reactive modified phenolic resin, which comprises mixing a heavy oil or pitch with 0.3 to 10 mol of a phenol, 0.2 to 9 mol in terms of formaldehyde, of a formaldehyde compound and 0.01 to 3.0 mol of an acid catalyst, each amount being based on 1 mol of the heavy oil or pitch calculated from an average molecular weight; and heating the resulting mixture with stirring, thereby to polycondensate the heavy oil or pitch, phenol and formaldehyde compound. According to this invention, there can be provided a process for producing simply and stably a highly reactive modified phenolic resin having low melt viscosity, excellent heat resistance and high reactivity with an epoxy resin, in one step.

18 Claims, No Drawings

HIGHLY REACTIVE MODIFIED PHENOLIC RESIN AND MOLDING MATERIAL FOR ELECTRICAL/ELECTRONIC PARTS AND SEMICONDUCTOR SEALING MATERIAL

This application is a Division of application Ser. No. 09/024,454 filed on Feb. 17, 1998, and now allowed.

TECHNICAL FIELD OF THE INVENTION

The present invention relates to a process for producing a highly reactive modified phenolic resin, which can simply produce a highly reactive modified phenolic resin having low viscosity in one step, said highly reactive modified phenolic resin in combination with an epoxy resin being capable of providing a molded article excellent in heat resistance, moisture resistance, corrosion resistance, adhesion and mechanical characteristics (e.g. dimensional stability, strength, etc.), particularly in moisture resistance and heat resistance, and which can use a polycondensation raw material capable of being stably fed and advantageous in view of the cost.

The present invention also relates to a modified phenolic resin molding material, a material for electrical/electronic parts and a semiconductor sealing material, which contain the highly reactive modified phenolic resin obtained by this process, and an epoxy resin.

TECHNICAL BACKGROUND OF THE INVENTION

Phenolic resin molded articles have widely been used lone or in combination with other resins such as epoxy resin, etc. for a long time because of excellent mechanical characteristics, but had a problem that the light-resistance and alkali resistance are slightly low, the dimension and electric resistance are liable to change by absorption of water or an alcohol, and the heat resistance (particularly oxidation resistance at high temperature) is inferior.

Therefore, as a method of solving such a problem, various modifications of the phenolic resin have been studied. For example, there have been suggested a lot of modified phenolic resins wherein the resistance to deterioration or oxidation due to light, chemical, etc. is improved by modification using fats, oils, rosin or a neutral aromatic compound.

For example, Japanese Patent Laid-Open Publication No. 61(1986)-235413 discloses that a phenolic resin having excellent heat resistance can be obtained by selecting a reaction component of a phenol modified aromatic hydrocarbon resin. However, the phenolic resin obtained by this method had a drawback that the resin must be maintained at a high temperature for a long time when a molded article is produced by using the phenolic resin.

Japanese Patent Laid-Open Publication No. 2(1990)-27414 discloses that a modified phenolic resin useful for molding material, having excellent heat resistance, oxidation resistance and mechanical strength, as cannot be expected from a conventional phenolic resin, is obtained by employing petroleum heavy oils or pitches as a cheap raw material and selecting special reaction condition.

Further, Japanese Patent Laid-Open Publication No. 4(1992)-145116 discloses that, in the production of such a phenolic resin, a crude modified phenolic resin obtained by a polycondensation of starting-compounds is subjected to a neutralization treatment, a water washing treatment and/or an extraction treatment to thereby neutralize and remove any acid remaining in the crude modified phenolic resin, so that a modified phenolic resin which does not corrode a metal member brought into contact with the resin is provided.

In the above process for producing the modified phenolic resin, the acid remaining in the crude modified phenolic resin is actually neutralized and removed by the neutralization treatment using an amine, followed by the water washing treatment. However, the modified phenolic resin obtained through the purification step involving the above neutralization and water washing treatments is likely to retain a neutralization product therein, so that there is a problem that it is unsatisfactory as a molding material used for a product on which strict requirements for thermal and corrosion resistance are imposed, such as a molding material for electrical or electronic part and a material for semiconductor sealer.

Japanese Patent Laid-Open Publication No. 6(1994)-228257 teaches that a modified phenolic resin containing substantially no acid can be obtained by purifying a crude modified phenolic resin through a purification step including a specific extraction treatment. The modified phenolic resin containing substantially no acid, obtained through this purification step, may be combined with an epoxy resin, so that a molding material can be obtained, which not only has excellent thermal and moisture resistance but also does not corrode any metals.

However, the above modified phenolic resin has a drawback in that the melt viscosity of the resin is so high that the resin is not suitable for speedy mass production of a molded article having a complex configuration. In addition, further improvements of thermal resistance, dimensional stability and strength and other mechanical properties have been demanded in the use of the modified phenolic resin in combination with an epoxy resin.

The present inventors proposed a process for producing a highly reactive modified phenolic resin having a low resin melt viscosity and an improved reactivity with the epoxy resins by means of reacting a modified phenolic resin with a phenol in the presence of an acid catalyst to thereby lower the molecular weight of the modified phenolic resin (See Japanese Patent Laid-Open Publication No. 7(1995)-252339 and Japanese Patent Application No. 8 (1996)-24173).

The highly reactive modified phenolic resins obtained as described above are relatively low in viscosity and are capable of providing a molding material having good thermal resistance and moldability, as well as superior mechanical strength such as dimensional stability when combined with an epoxy resin.

However, according to such a method of producing the modified phenolic resin, two steps of the polycondensation step and the molecular-weight lowering step are required and, therefore, the production step became complicated.

By the way, in case of-soldering which is generally performed on production of electrical appliances, electrical/electronic parts are exposed to high temperature. From this point of view, a further improvement in heat resistance is requested to the modified phenolic resin used as a resin material for electrical/electronic parts or semiconductor sealing material.

When the moisture absorption property of the resin material is high, there arises a problem that water is rapidly evaporated on soldering to cause a package crack and has a capability of corroding metal material combined with the resin.

The resin material is often used in combination with a metal member in the field of the electrical/electronic parts or semiconductor sealing material, and the reliability of the product is largely influenced by the adhesion between the resin material and metal member.

Accordingly, a further improvement in moisture absorption and that in adhesion were also rquired to the modified phenolic resin.

In addition to the simplification of the production step and improvement in characteristics of the resulting modified phenolic resin as described above, it is also highly requested to use a raw oil which can be obtained more effectively and stably and is advantageous in view of the cost, in place of a raw oil obtained by redistilling a residual oil obtained in a conventional catalytic cracking step.

The present inventors have studied intensively about a method of producing a highly reactive modified phenolic resin having excellent characteristics described above more simply. As a result, it has been found that, by mixing specific raw materials (including a catalyst) in a specific ratio to polycondense them, a highly reactive modified phenolic resin having high reactivity with the epoxy resin and low viscosity can be obtained in one step.

The present inventors also have found that a molding material prepared by using this highly reactive modified phenolic resin in combination with an epoxy resin can provide a molded article which is excellent in heat resistance, moisture resistance, corrosion resistance, adhesion, and mechanical characteristics (e.g. dimensional stability, strength, etc.), particularly moisture resistance and heat resistance.

The present invention has been accomplished based on these findings of the present inventors.

OBJECTS OF THE INVENTION

The present invention has been accomplished to solve the above described problems of the prior art, and an object thereof is to provide a process for producing a highly reactive modified phenolic resin which can simply and stably produce and feed a highly reactive modified phenolic resin having low melt viscosity and high reactivity with an epoxy resin in one step.

Another object of the present invention is to provide a molding material, particularly material for electrical/ electronic parts and semiconductor sealing material, comprising the highly reactive modified phenolic resin obtained by the above method, and an epoxy resin, which can produce a molded article which is excellent in heat resistance, moisture resistance, corrosion resistance, adhesion, and mechanical characteristics (e.g. dimensional stability, strength, etc.), particularly moisture resistance and heat resistance.

SUMMARY OF THE INVENTION

The method of producing the highly reactive modified phenolic resin according to the present invention comprises mixing a heavy oil or pitch, a phenol, a formaldehyde compound and an acid catalyst in a specific amount, and heating the resulting mixture with stirring, thereby to polycondensate the heavy oil or pitch, phenol and formaldehyde compound.

In the present invention, the polycondensation reaction may be performed by heating the mixture obtained by mixing all polycondensation raw materials (including the catalyst) with stirring (first process), or the polycondensation may be performed by heating the mixture obtained by mixing specific ones selected from among the polycondensation raw materials (including the catalyst) with stirring, and polycondensing while adding gradually the remainder of the polycondensation raw materials (or catalyst) (second to sixth process).

In the first to sixth processes of producing the highly reactive modified phenolic resin according to the present invention, a petroleum- or coal-based material, especially, a specific distilled oil obtained in the catalytic cracking step or a thermal cracking step during the petroleum refining process can be used as the heavy oil or pitch and, furthermore, an aromatic hydrocarbon compound can be also added as the raw material.

In the first to sixth processes of producing the highly reactive modified phenolic resin according to the present invention, it is desirable to use a Brønsted acid selected from the group consisting of organic acid, inorganic acid and solid acid as the above acid catalyst.

In the first to sixth processes of producing the highly reactive modified phenolic resin according to the present invention, the heavy oil or pitch may be used after subjecting to a treatment of removing a paraffin fraction as a low-reactive component.

In the production process of the present invention, it is preferable to purify the highly reactive modified phenolic resin obtained by the above polycondensation reaction, by at least one step selected from the group consisting of:

(i) a step of removing an unreacted component from the reaction mixture, (ii) a step of removing a catalyst residue, and (iii) a step of removing the remained phenol, and to use the resulting purified highly reactive modified phenolic resin in various purposes.

The modified phenolic resin molding material of the present invention comprises the highly reactive modified phenolic resin obtained by the above process and an epoxy resin. This modified phenolic resin molding material may further contain an inorganic filler, in addition to these resin components.

The electrical/electronic parts of the present invention are obtained by molding the highly reactive modified phenolic resin molding material.

Furthermore, the semiconductor sealing material of the present invention is composed of the highly reactive modified phenolic resin molding material.

DETAILED DESCRIPTION OF THE INVENTION

The present invention will be described in detail hereinafter.

In the process for producing the highly reactive modified phenolic resin according to the present invention, the highly reactive modified phenolic resin is produced by heating a mixture containing a specific amount of heavy oil or pitch, a formaldehyde compound, a phenol and an acid catalyst with stirring, thereby to perform the polycondensation reaction.

As the heavy oil or pitch used for the raw material of the polycondensation reaction in the present invention, any of petroleum- and coal-based raw oils may be used. Examples of the petroleum heavy oil or pitch include distilled residual oil, hydrogenolysis residual oil and catalytic cracking residual oil of crude oil; thermal cracking residual oil of naphtha or LPG; vacuum distillate of these residual oils; extract by solvent extraction or heat-treated product; and specific distilled oil obtained by cracking steps during the petroleum refining process such as thermal cracking, catalytic cracking, etc. Examples of the coal heavy oils or pitches include specific fractional component obtained by distilling coal tar in coal dry distillation, and heavy oil in coal liquefaction.

It is preferable that those having suitable aromatic hydrocarbon fraction fa value and aromatic ring hydrogen content Ha value be selected from the petroleum heavy oils or pitches and used.

The petroleum heavy oils or pitches desirably have a fa value of 0.40 to 0.95, preferably 0.5 to 0.8, more preferably 0.55 to 0.75, and a Ha value of 20 to 80%, preferably 25 to 60%, more preferably 25 to 50%.

The fa value and Ha value are calculated from data by measurements of $^{13}$C-NMR and $^1$H-NMR of petroleum heavy oils or pitches according to the following equations, respectively.

$$fa \text{ value} = \frac{\text{number of aromatic carbon atoms in oil or pitch}}{\text{number of all carbon atoms in oil or pitch}}$$

$$Ha \text{ value (\%)} = \frac{\text{number of hydrogen atoms of aromatic rings in oil pitch}}{\text{number of all hydrogen atoms in oil or pitch}} \times 100$$

When the fa value of the petroleum heavy oil or pitch as a raw material is smaller than 0.4, the aromatic content is low, so that it is likely that the effect thereof on the improvement of the performance, such as thermal and oxidation resistance, of the resultant modified phenolic resin is less.

On the other hand, when the petroleum heavy oil or pitch has an fa value of greater than 0.95, the reactivity of carbons of aromatic rings with formaldehyde is likely to become unfavorably low.

When the Ha value of the petroleum heavy oil or pitch as a raw material is smaller than 20%, the amount of aromatic ring hydrogen atoms reacting with formaldehyde is less to thereby cause the reactivity lowering, so that the effect thereof on the improvement of the performance of the phenolic resin is likely to become poor.

On the other hand, when a petroleum heavy oil or pitch having an Ha value of greater than 80% is used as a raw material, the strength of the modified phenolic resin is likely to become poor.

It is particularly preferable to use a distilled oil obtained in cracking steps such as thermal cracking and catalytic cracking in the petroleum refining process as the petroleum heavy oils or pitches in view of stable feed of the raw material, elimination of a pretreatment, etc.

In the petroleum refining process, examples of the raw material used in the cracking step include tar sand, and residual oil, refined oil and intermediate refined oil, for example, oils obtained in distillation step, such as straight-run heavy gas oil, topped crude oil and vacuum distillation residual oil; and oils obtained in the desulfurization step, such as desulfurized vacuum heavy gas oil and desulfurized heavy oil. Among these residual oils, refined oils and intermediate refined oils, tar sand, topped crude oil and vacuum distilled residual oil are normally used in the thermal cracking, and straight-run heavy gas oil, topped crude oil, desulfurized vacuum heavy gas oil and desulfurized heavy oil are normally used in the catalytic cracking.

The catalytic cracking method and thermal cracking method applied in the production of the distilled oil may be any method capable of obtaining a distilled oil having the above desired characteristics and not specifically limited. That is, any catalytic cracking method or thermal cracking method, which has hitherto been applied in the field of the petroleum purification, can be used. Accordingly, examples of the catalytic cracking method include moving bed catalytic cracking method, air-lift thermophore catalytic cracking method, Houdriflow catalytic cracking method, fluidized bed catalytic cracking (FCC) method, UOP fluid catalytic cracking method, Shell 2-stage fluid catalytic cracking method, ER & E Model IV catalytic cracking method, Orthoflow catalytic cracking method and the like. Examples of the thermal cracking method include delayed coking method, fluid coking method, Flexicoking method, bisbreaking method, EUREKA method, CHERY-P method, ACTIV method, KKI method, Coke fluidized bed coking method, ACR and the like.

In the cracking step, the catalytically cracked product and thermally cracked product thus obtained by these methods are separated into fractions having various true boiling points and various compound compositions. Among them, the distilled oil used preferably in the present invention has the above aromatic hydrocarbon fraction fa value and aromatic ring hydrogen content Ha value and has a true boiling point of 180 to 500° C., preferably 180 to 490° C., more preferably of 190 to 490° C.

When a distilled oil having a true boiling point of less than 180° C. is used, the amount of the condensed polycyclic aromatic component contained in the raw oil is small and the reactivity is lowered.

Such a distilled oil is a comparatively heavy fraction drawn from the column intermediate stage other than the column top and column bottom, among those distilled in the cracking step. Accordingly, by using the column-intermediate distilled oil as the polycondensation raw material, it is possible to use, as a raw material, a fraction obtained by feeding from a reaction column to a distillation column, i.e. intermediate refined oil and circulating oil in the catalytic cracking device and the thermal cracking device which have hitherto been used in the cracking step of the petroleum refining process, and it is not necessary to distill a bottom oil again. Therefore, it becomes possible to feed the raw material in high stability and low cost.

The fractional component obtained by distillation of coal tar, described as the coal raw material, is a fractional component having a boiling point of higher than 200° C., preferably 200 to 360° C.

The coal dry distillation is an essential step in the coal chemical industry, and is performed to produce a gas, coal tar and coke from coal.

The coal tar produced by the coal dry distillation is classified into coal oven tar, horizontal retort tar, vertical retort tar, producer tar, aqueous gas tar, etc. corresponding to the dry distillation system.

The coal tar is classified into high-temperature tar (900 to 1200° C.) and low-temperature tar (450 to 700° C.) corresponding to the dry distillation temperature, and they differ in composition and properties.

In the present invention, the fractional component used as the coal heavy oil or pitch may be any of those obtained by distilling any coal so long as the fractional component has the above boiling point, but high-temperature coal such as coke oven tar is particularly preferable for the method of the fractional component in view of large content of the desired distilled component.

When these coal tars are distilled, various fractional components can be obtained. For example, when the coak oven tar obtained in the production of coak is distilled, tar gas oil (boiling point: about 94 to 178° C.), carbol gas oil (carbolic oil: boiling point of about 168 to 200° C.), naphthalene oil (middle oil) and absorbing oil (boiling point: about 202 to 223° C.), heavy oil (boiling point: about 218 to 314° C.), anthracene oil (boiling point: about 296 to 360° C.) and pitch (residue: boiling point of about 450° C. or more), etc. can be obtained as the fractional components.

Among them, the fractional component whose boiling point exceeds 200° C. include naphthalene oil, absorbing oil, heavy oil, anthracene oil and pitch.

As the coal heavy oil or pitch used in the present invention, these fractional components having the above boiling point may be used alone or in combination thereof. Those obtained by separating/recovering specific components from a mixture of these fractional components may also be used. For example, it is also possible to use a mixture of the fractions having a boiling point higher than that of naphthalene oil, such as creosote oil obtained by separating/recovering naphthalene, anthracene, tar acids, tar base, etc. and mixing them.

The coal heavy oil or pitch (coal tar) have a higher Fa and Ha values than the petroleum-based materials, but the reaction thereof with the formaldehyde compound well undergoes. From the fact, it can be expected that the coal-based material may have an essential difference in reactivity-with the formaldehyde compound from the petroleum-based material, based on its molecular structure.

When a fractional component having a boiling point of 200° C. or less is used, the amount of the condensed polycyclic aromatic component contained in the raw oil is small and the reactivity is lowered.

The coal liquefaction is performed to produce gasoline from coal, and is a process comprising reacting coal with high-pressure hydrogen (200 to 700 atm) at high temperature of about 500° C. and subjecting the resulting product to various reactions such as coal structure cleavage, deoxygenation, desulfutrization, distillation hydrogenation, etc. to form a lower hydrocarbon.

In the present invention, as the coal heavy oil or pitch, such a heavy oil produced by the coal liquefaction can also be used, and this heavy oil may be used alone or in combination with one or more coal tar fraction components described above.

The coal heavy oils or pitches described above are products which are stably produced by the general step in the coal chemical industry. Accordingly, it becomes possible to feed the raw material in high stability and low cost by using them.

In the present invention, the coal heavy oils or pitches may be used as they are, but there is a possibility to contain acidic compounds such as phenols, carboxylic acids, etc. and basic compounds such as carbazoles, pyridines, anilines, quinolines, etc. Therefore, these compounds are preferably removed.

The removal of these acidic compounds and basic compounds can be performed, for example, by extraction with sulfuric acid, sodium hydroxide, and the like.

In the petroleum and coal heavy oils or pitches described above, the number of condensed rings constituting them is not specifically limited, but the petroleum and coal heavy oils or pitches are preferably composed mainly of condensed polycyclic aromatic hydrocarbons of 2 to 4 rings. When the heavy oils or pitches exclusively contain condensed polycyclic aromatic hydrocarbons of 5 or more rings, this condensed polycyclic aromatic hydrocarbon has generally high boiling point and the boiling point exceeds 450° C., sometimes. Therefore, a scatter in boiling point of the raw material increases and it becomes difficult to collect those having narrow boiling range, thereby making it difficult to stabilize the quality of the product. Furthermore, when the heavy oils or pitches are mainly composed of monocyclic aromatic hydrocarbons, the reactivity between them and formaldehyde is low so that the modification effect of the resulting phenolic resin is liable to become smaller.

These heavy oils or pitches may be used as they are in the polycondensation reaction, but may also be used after subjecting to a treatment of removing a saturated hydrocarbon fraction having 15 to 40 carbon atoms, which contains a low-reactive paraffin fraction, i.e. normal paraffin, isoparaffin, cycloparaffin, etc.

Such a treatment of removing the paraffin fraction can be performed, for example, by column chromatography at 80 to 120° C. using furfural according to a normal method.

Examples of a filler to be packed in the column used in column chromatography include active alumina gel, silica gel and the like. These fillers can be used alone or in combination thereof.

Examples of a developer used in the chromatography include aliphatic saturated hydrocarbon compounds having 5 to 8 carbon atoms, such as n-pentane, n-hexane, n-heptane and n-octane; ethers such as diethyl ether; halogenated hydrocarbons such as chloroform and carbon tetrachloride; and alcohol such as methyl alcohol and ethyl alcohol. These developers are preferably used in combination thereof, appropriately.

By performing such a treatment of removing a paraffin fraction, not only the modification effect of the performances of the modified phenolic resin can be improved, but also the amount of the unreacted component can be reduced to facilitate the purification treatment.

Examples of the phenol used, together with the above heavy oils or pitches, as the raw material in the present invention include hydroxybenzene compound and hydroxynaphthalene compound. Examples of the hydroxybenzene compound include phenol, cresol, xylenol, resorcin, hydroquinone, catechol, phenyl phenol, vinyl phenol, nonyl phenol, p-tert-butyl phenol, bisphenol A, bisphenol F and the like. Examples of the hydroxynaphthalene compound include monohydroxynaphthalene compounds such as α-naphthol and β-naphthol; dihydroxynaphthalene compounds such as 1,2-dihydroxynaphthalene, 1,3-dihydroxynaphthalene; 1,4-dihydroxynaphthalene, 2,3-dihydroxynaphthane, 3,6-dihydroxynaphthalene, 1,5-dihydroxyaphthalene, 1,6-dihydroxynaphthalene, 1,7-dihydroxynaphthane, 2,6-dihydroxynaphthalene and 2,7-dihydroxynaphthane; and mono- or dihydroxynaphthalene compounds having a substituent (e.g. alkyl group, aromatic group, halogen atom, etc.), such as 2-methyl-l-naphthol, 4-phenyl-1-naphthol, 1-bromo-2-naphthol and 6-bromo-2-naphthol. These phenols may be used alone or in combination thereof.

In the process of producing the highly reactive modified phenolic resin according to the present invention, it is desired that the phenol is used in an amount of 0.3 mol or more and 10 mol or less, preferably 9 or less, more preferably 8 or less, per mol of the heavy oil or pitch calculated from the average molecular weight.

When the phenol is used in the amount of less than 0.3 mol, since the reactivity between the heavy oil or pitch and formaldehyde is inferior to that between the phenol and formaldehyde, sufficient crosslink density may become not obtained and the strength of the cured article may become smaller than that of a general phenolic resin. Particularly, the cured articles are liable to show a drawback such as low impact resistance and brittleness. On the other hand, when the amount of the phenol exceeds 10 mol, the modification effect as a result of the modification of the phenolic resin is liable to decrease.

The aromatic hydrocarbon compound used in the polycondensation reaction of the present invention is an aromatic hydrocarbon compound composed only of a hydrocarbon group and an aromatic ring or a halogenated product thereof, and it has an effect of improving the moisture absorption-resistant property and adhesion of the resin.

In the aromatic hydrocarbon compound used in the present invention, the aromatic ring may be a single ring or a condensed ring, and the same or different two or more aromatic rings may be combined by a bond or a hydrocarbon bonding group.

Examples of the hydrocarbon group as a substituent of the aromatic ring include alkyl groups such as methyl group, ethyl group and the like.

Examples of the halogen atom contained in the halogenated aromatic hydrocarbon compound include fluorine, chlorine, bromine, iodine and the like.

Examples of the aromatic hydrocarbon compound include compounds having a non-condensed aromatic ring, for example, alkyl group-substituted benzene compounds such as toluene, o-xylene, m-xylene, p-xylene, etc.; and halogenated benzene compounds (which may be substituted with an alkyl substituent) such as chlorobenzene, o-chlorotoluene, m-chlorotoluene, p-chlorotoluene, etc.

In the first to sixth processes of producing the highly reactive modified phenolic resin according to the present invention, the aromatic hydrocarbon compound is desirably used in an amount of 0.1 to 5 mol, preferably 0.5 to 3 mol, more preferably 0.5 to 2 mol, per mol of the heavy oils or pitches calculated from the average molecular weight.

When the aromatic hydrocarbon compound is used in an amount of less than 0.1 mol, the desired improving effect of the moisture absorption property and adhesion may not be obtained. On the other hand, when the amount of the aromatic hydrocarbon compound exceeds 5 mol, the desired improving effect of the heat resistance may not be obtained.

Examples of the formaldehyde compound used in the polycondensation reaction of the present invention include linear polymers such as paraformaldehyde and polyoxyethylene (particularly oligomer); and cyclic polymers such as trioxane, in addition to formaldehyde.

Such a formaldehyde compound serves as a crosslinking agent, and paraformaldehyde and formaldehyde are particularly preferable. The formaldehyde compound may be used after dissolving in a suitable solvent such as water, etc. Accordingly, formaldehyde may be used as an aqueous solution having a suitable concentration, and it is particularly preferable to use it as formalin (concentration: 35% or more).

In the method of producing the highly reactive modified phenolic resin according to the present invention, such a formaldehyde compound is desirably used in an amount of 0.2 or more, preferably 0.5 or more, and 9 mol or less, preferably 7 mol or less, more preferably 6 mol or less in terms of formaldehyde, per mol of the heavy oil or pitch calculated from the average molecular weight.

When the amount of the formaldehyde compound per mol of the heavy oil or pitch is less than 0.2 mol, the resin yield is lowered and the strength of the resulting modified phenolic resin is unfavorably low. On the other hand, when the amount of the formaldehyde compound is larger than 9 mol, not only the resulting modified phenolic resin becomes to have so high moleclar weight that the desired viscosity is not obtained, but also the reaction mixture is sometimes solidified.

In the second to sixth methods of producing the phenolic resin according to the present invention, the formaldehyde compound is used in the amount of 1 mol or less, preferably 0.9 mol or less, more preferably 0.8 mol or less, in terms of formaldehyde, per mol of the phenol.

When the amount of the formaldehyde compound per mol of the phenol exceeds 1 mol, not only the resulting modified phenolic resin becomes to have so high molecular weight that the desired viscosity is not obtained, but also the reaction mixture is sometimes solidified.

In the polycondensation reaction according to the present invention, an acid catalyst is used to polycondensate the heavy oils or pitches, formaldehyde compound and phenols. As such an acid catalyst, a Brønsted acid or a Lewis acid can be used, but a Brønsted acid is preferably used. Examples of the Brønsted acid include organic acids such as oxalic acid, toluenesulfonic acid, xylenesulfonic acid and formic acid; inorganic acids such as hydrochloric acid and sulfuric acid; and solid acids such as acidic cation exchange resin.

Among these Brønstead acids, oxalic acid and sulfuric acid are preferable as the organic acid and inorganic acid, respectively.

The acidic cation exchange resin used as the solid acid is a resin obtained by covalent-bonding a base resin having a three-dimensional network with a cation exchange group.

Examples of the base resin include polystyrene, styrene/divinylbenzene copolymer, poly(meth)acrylic acid and polyacrylonitrile. Examples of the cation exchange group include strong-acidic groups such as sulfonate group; and weak-acidic groups such as carboxyl group.

The acidic cation exchange resin as the acid catalyst is desirably used as a spherical substance having a normal particle size of 15 to 50 mesh.

Specific examples of the acidic cation exchange resin include strong-acidic cation exchange resins such as Daiya-ion SKIB, PK216, SH104 and PK208 (trade name, manufactured by Mitsubishi Chemical Co., Ltd.), Amberlite IR-120B and IR-112 (trade name, manufactured by Organo Co.), Dowex 50wx 8, HCR and HGR (trade name, manufactured by Dow Chemical Co.)., and Duolite C-20 and C-25 (trade name, manufactured by Sumitomo Chemical Industries Co., Ltd.); and weak-acidic cation exchange resins such as Daiya-ion WK10 (trade name, manufactured by Mitsubishi Chemical Co., Ltd.), Amberlite IRc-50 (trade name, manufactured by Organo Co.) and Duolite CS-101 (trade name, manufactured by Sumitomo Chemical Industries Co., Ltd.).

When such a solid acid is used as the acid catalyst, an acid is not contained in the reaction mixture at the free state. Therefore, there is an advantage that a low-density highly reactive modified phenolic resin containing substantially no acid can be obtained by removing the solid acid from the polycondensation reaction product by a simple method such as filtration.

In the first process according to the present invention, the acid catalyst is used in an amount of 0.01 mol or more, preferably 0.05 mol or more, and 3 mol or less, preferably 2 mol or less, per mol of the heavy oil or pitch calculated from the average molecular weight. In the second to sixth processes according to the present invention, the acid catalyst is desirably used in an amount of 0.01 mol or more, and 3 mol or less, preferably 2.5 mol or less, more preferably 2 mol or less, per mol of the heavy oil or pitch calculated from the average molecular weight. When the acidic cation exchange resin is used as the acid catalyst, the amount of the above acid catalyst is a value in-terms of a cation exchange group.

When the amount of the acid catalyst is small, the reaction time is liable to increase and, if the reaction temperature is not high, the reaction is liable to be insufficient. On the other hand, even if the amount of the acid catalyst is increased, the reaction rate does not increase and it may become disadvantageous in view of the cost.

In the first process for producing the highly reactive modified phenolic resin according to the present invention, a specific amount of the above-described raw materials and acid catalyst are previously mixed and then the resulting mixture is polycondensed by heating with stirring.

In the polycondensation reaction of the heavy oil or pitch, phenol and formaldehyde compound in the presence of the acid catalyst, the raw material mixing temperature, mixing time, polycondensation temperature and reaction time are controlled according to the raw material composition and properties of the resulting resin. As a matter of course, the reaction temperature and reaction time are conditions which interact each other.

Such a polycondensation reaction can be performed, for example, by the following method.

First, the specific amount of the above heavy oil or pitch, phenol, formaldehyde and acid catalyst are uniformly mixed by stirring at the temperature where no polycondensation proceeds, e.g. 50° C. or less, preferably 40 to 50° C.

Then, the resulting mixture is slowly heated to the temperature of 50 to 200° C., preferably 80 to 200° C., more preferably 80 to 180° C., and the polycondensation reaction is performed for 15 minutes to 8 hours, preferably 30 minutes to 6 hours.

Mixing of the polymerization raw materials is performed so that an uniform mixture is obtained before the polycondensation reaction proceeds, and may be performed while slowly elevating the temperature to the polycondensation reaction temperature.

In the second to sixth process of producing the highly reactive modified phenolic resin according to the present invention, at least one of the heavy oil or pitch, acid catalyst and formaldehyde compound is gradually or successively added in the polycondensation reaction using the above-described raw materials and acid catalyst.

That is, in the second process for producing the highly reactive modified phenolic resin, first, the heavy oil or pitch and phenol are mixed and heated with stirring, and then the formaldehyde compound and acid catalyst are gradually added to this mixture during heating with stirring. In this process, the acid catalyst and total amount of the formaldehyde may be gradually added. On the other hand, when a part of the formaldehyde compound has been mixed in the mixture to be heated with stirring, the remainder of the formaldehyde compound is gradually added, together with the acid catalyst.

In the third process for producing the highly reactive modified phenolic resin according to the present invention, first, the heavy oil or pitch, phenol and formaldehyde compound are mixed and heated with stirring, and then only the acid catalyst is gradually added to this mixture during heating with stirring.

In the fourth process for producing the highly reactive modified phenolic resin according to the present invention, first, the petroleum heavy oil or pitch, phenol and acid catalyst are mixed and heated with stirring, and then only the formaldehyde compound is gradually added to this mixture during heating with stirring.

In the fifth process for producing the highly reactive modified phenolic resin according to the present invention, first, the heavy oil or pitch, phenol and acid catalyst are mixed and heated with stirring, and then the phenol and formaldehyde compound are gradually added to this mixture during heating with stirring.

In the sixth process for producing the highly reactive modified phenolic resin according to the present invention, first, the formaldehyde compound and acid catalyst are mixed and heated with stirring, and then the heavy oil or pitch and phenol are gradually added to this mixture during heating with stirring.

In the second to sixth processes of producing the highly reactive modified phenolic resin according to the present invention, the gradual addition of the heavy oils or pitches, acid catalyst and/or formaldehyde compound is desirably performed over 10 to 120 minutes, preferably 20 to 80 minutes, by using a method such as dropwise addition, etc.

When the addition time is less than 10 minutes, the reaction may rapidly proceed to cause drastic heat generation and it unfavorably becomes difficult to control the temperature. On the other hand, when the addition time exceeds 120 minutes, it takes a long time to the addition and the reaction times is liable to become longer.

In the polycondensation reaction according to the present invention, the gradual addition to the mixture during heating with stirring is not specifically limited in its initiation time and may be started in the state where the mixture during heating with stirring is uniformly mixed and the temperature is stable.

In the second process for producing the modified phenolic resin according to the present invention, the formaldehyde compound is gradually added together with the acid catalyst, but this gradual addition of the formaldehyde compound may be started or terminated simultaneously with the gradual addition of the acid catalyst. In this case, both are desirably mixed. The gradual addition of the formaldehyde compound may be performed separately with the addition of the acid catalyst. In this case, the addition of the formaldehyde compound may be performed simultaneously with the addition of the acid catalyst, or may be started before the addition of the acid catalyst.

In the polycondensation reaction of the heavy oil or pitch, phenol and formaldehyde compound in the presence of the acid catalyst, wherein the raw materials and acid catalyst are added in such an order, the reaction temperature and reaction time are controlled according to the raw material composition, addition rate of the acid catalyst, properties of the resulting resin, etc. As a matter of course, the reaction temperature and reaction time are conditions which interact each other.

In the second to fourth processes of producing the highly reactive modified phenolic resin according to the present invention, such a polycondensation reaction can be performed, for example, by the following method.

First, the raw material containing the heavy oils or pitches and phenols and, if necessary, at least a part of the formaldehyde compound or acid catalyst is uniformly mixed by heating with stirring at the temperature of 30 to 120° C., preferably 40 to 80° C., before the addition of the formaldehyde compound and/or acid catalyst.

Then, the formaldehyde compound and/or acid catalyst are gradually added while paying attention to a rapid increase in temperature of the reaction mixture.

After the completion of the addition of the formaldehyde compound and/or acid catalyst, the reaction mixture is heated to the temperature of 50 to 200° C., preferably 80 to 200° C., more preferably 80 to 180° C., and the reaction is performed for 15 minutes to 8 hours, preferably 30 minutes to 6 hours. The fifth and sixth processes can be carried out under the same conditions.

In the first to sixth processes according to the present invention, the polycondensation reaction of the heavy oil or pitch, formaldehyde compound and phenol can be performed without using a solvent, but the viscosity of the reaction mixture (reaction system) may be reduced by using a suitable solvent to make an uniform reaction performed.

Examples of such a solvent include nitrated aromatic hydrocarbons such as nitrobenzene; nitrated aliphatic hydrocarbons such as nitroethane and nitropropane; and halogenated aliphatic hydrocarbons such as Perchlene, Trichlene and carbon tetrachloride.

Regarding the above-described processes of producing the highly reactive modified phenolic resin according to the present invention, a molecular weight lowering step is not required and the number of steps is markedly reduced in comparison with the process for producing the highly reactive modified phenolic resin disclosed in Japanese Patent Laid-open Publication No. 7(1995)-252339.

The highly reactive modified phenolic resin of the present invention is excellent in moldability because of its low resin melt viscosity, and is excellent in heat resistance to the highly reactive modified phenolic resin disclosed in Japanese Patent Laid-Open Publication No. 7(1995)-252339. Furthermore, the highly reactive modified phenolic resin of the present invention has excellent adhesion and low moisture absorption property when the aromatic hydrocarbon compounds is contained as the raw material. Since the highly reactive modified phenolic resin of the present invention has these characteristics, it is possible to provide a modified phenolic resin molding material which is superior in mechanical characteristics (e.g. dimensional stability, strength, etc.), moisture resistance and heat resistance and shows excellent adhesion and low moisture absorption property by using in combination with an epoxy resin.

The highly reactive modified phenolic resin thus produced can be applied to various purposes, but there is a possibility that the unreacted component and acid catalyst are remained in the resin. Therefore, it is preferable that the unreacted component, low molecular component, acid catalyst and reaction solvent be removed by subjecting it to a purification treatment, appropriately.

Examples of the process of purifying the reaction mixture, i.e., the crude highly reactive modified phenolic resin containing the acid catalyst, low molecular component and reaction solvent include (i) purification treatment of removing the unreacted component from the reaction mixture, (ii) purification treatment of removing the catalyst residue from the reaction mixture, and (iii) purification treatment of removing the remaining phenols by any one of steam distillation, blowing of a nitrogen gas and vacuum distillation.

In the above purification treatment (i), among the components contained in the heavy oil or pitch used as the raw material, the component remained in the reaction product in the unreacted state or the state of insufficient reaction, and the reaction solvent used in the reaction are removed.

In the first treatment of removing the unreacted component from the reaction mixture, the polycondensation reaction obtained by the first to sixth polycondensation processes is brought into contact with a specific extraction solvent at the temperature where this reaction mixture is capable of keeping a flow state, thereby to remove the unreacted substance contained in the reaction mixture, e.g. low-reactive substance contained in the heavy oils or pitches and a low molecular weight component remained in the state of insufficient reaction.

The temperature where the reaction mixture is capable of keeping a flow state is a temperature where the reaction mixture can maintain a liquid state to form a liquid-liquid two-phase with the extraction solvent, or a temperature where the reaction mixture can maintain a flow state by being dissolved in the extraction solvent. The rate and efficiency of extraction of the unreacted substance, contained in the reaction mixture, into the extraction solvent can be increased by heating the reaction mixture to the temperature where the reaction mixture can maintain the flow state and bringing it into contact with the extraction solvent.

The extraction solvent used in this first treatment is a solvent which forms a liquid-liquid two-phase system or a solution with the reaction mixture containing the modified phenolic resin as a main component at the above temperature, and forms a liquid-liquid two-phase system or a liquid-solid two-phase system at lower temperature. Specifically, the solvent is selected from aliphatic hydrocarbon having 6 to 20 carbon atoms, alicyclic hydrocarbon having 6 to 20 carbon atoms, aromatic hydrocarbon having 6 to 20 carbon atoms and aliphatic petroleum fraction.

Examples of the aliphatic hydrocarbon include hexane, heptane, octane, nonane, decane, undecane, dodecane, tridecane, tetradecane, pentadecane, hexadecane and the like.

Examples of the alicyclic hydrocarbon include cyclohexane, cycloheptane, cyclooctane and the like.

Examples of aromatic hydrocarbon include benzene, toluene, xylene and the like.

Examples of the aliphatic petroleum fraction include kerosene, naphtha and the like.

As the extraction solvent, these compounds may be used alone or in combination thereof. Among them, n-heptane, n-octane and naphtha are particularly preferable.

In the present invention, the contact between the extraction solvent and reaction mixture can be performed by introducing both into the same vessel and heating to a temperature where the reaction mixture becomes the fluid state. The contact between the extraction solvent and reaction mixture may be started by pouring, to the reaction mixture heated to the desired temperature, the extraction solvent of the same temperature as that of the reaction mixture, and may be started by introducing the former into the latter.

The extraction efficiency of the unreacted substance can be improved by mixing the reaction mixture and extraction solvent with stirring at the time of contacting the reaction mixture with the extraction solvent. Particularly, when the reaction mixture and extraction solvent form a liquid-liquid two-layer, an increase in contact area therebetween caused by stirring accelerates rapid and efficient extraction of the unreacted substance.

The first treatment may be performed under reflux or performed in a closed system without reflux to prevent a reduction in amount of the extraction solvent by evaporation.

In the first treatment, the contact between the reaction mixture and extraction solvent is desirably performed at 50 to 200° C., preferably 70 to 130° C., more preferably 80 to 120° C.

The amount of the extraction solvent used in the first treatment can be appropriately selected in accordance with the amount of the unreacted substance contained in the reaction mixture, amount of the unreacted substance to be removed by one purification treatment, but is desirably in the range of 0.5 to 4 ml, preferably 1 to 2 ml, per 1 g of the reaction mixture.

In the first treatment, the contacting period is not specifically limited, but the first treatment can be rapidly performed normally over 10 to 60 minutes, particularly 20 to 30 minutes.

After the completion of the contact operation described above, the reaction mixture and extraction solvent are allowed to stand with air-cooling or cooling, thereby forming a liquid-liquid two-phase system or a liquid-solid two-phase system. By separating the extraction solvent with decantation, the unreacted substance dissolved in this solvent can be easily removed.

In the first treatment, a processing is carried out by performing the contact operation and separation operation in this order, but the number of this processing is not specifically limited. The processing may be performed once, or may be repeated a plurality of times while replacing by a fresh extraction solvent.

According to the first treatment, since the extraction operation is performed in the state where the reaction mixture is in a flow state, the unreacted substance can be removed in good efficiency using a smaller amount of the solvent. Since it is not necessary to maintain the liquid-solid two-phase system during the contact operation, the contact temperature can be set, easily.

In another treatment (second treatment) which can be applied in the purification step (i), first, the reaction mixture obtained in the polycondensation reaction or crude highly reactive modified phenolic resin is dissolved in a reaction mixture-soluble solvent.

Examples of the soluble solvent include toluene; mixed solvent of toluene and alcohol (e.g. ethyl alcohol, etc.); mixed solvent of toluene and ketones (e.g. acetone, methyl ethyl ketone, methyl isobutyl ketone, etc.); and mixed solvent of toluene and ethers (e.g. tetrahydrofuran, diethyl ether, methyl tert-butyl ether, etc.).

Since a solution obtained by dissolving the crude highly reactive modified phenolic resin in these soluble solvents has low viscosity and good operating property, the purification processing is easily performed.

Then, the solution thus obtained is introduced into a solvent containing at least one compound selected from the group consisting of aliphatic hydrocarbon having 10 carbon atoms or less, alicyclic hydrocarbon having 10 carbon atoms or less and aliphatic petroleum fraction. As a result, the resin main component is deposited, thereby removing components which are soluble in the solvent, that is, components remained in the state of being unreacted or reacted insufficiently and the reaction solvent during the polycondensation reaction.

Examples of the hydrocarbon solvent include aliphatic or alicyclic hydrocarbons such as pentane, hexane, heptane and cyclohexane; and alicyclic petroleum fraction such as naphtha. Among them, n-hexane and naphtha are particularly preferable. The highly reactive modified phenolic resin obtained in the second treatment of this purification step (i) is in the form of powder.

In another treatment (third treatment) of the purification step (i), first, the reaction mixture or crude highly reactive modified phenolic resin obtained by the polycondensation reaction is dissolved in a reaction mixture-soluble solvent.

Examples of the reaction mixture-soluble solvent include acetonitrile, methanol and dimethyl sulfoxide.

Then, the resulting solution is separated from this solution containing the above highly reactive modified phenolic resin to form a liquid-liquid two-layer solvent system, and is brought into contact with an extraction solvent which dissolves the unreacted component to remove the component which is soluble in this extraction solvent, that is, unreacted component, component remained in the state of being insufficiently reacted and reaction solvent during the polycondensation reaction by extraction.

Such an extraction solvent can be appropriately selected in accordance with the soluble solvent. For example, when using acetonitrile, methanol or dimethyl sulfoxide as the soluble solvent, a solvent containing at least one compound selected from the group consisting of aliphatic hydrocarbon having 10 carbon atoms or less, alicyclic hydrocarbon having 10 carbon atoms or less and aliphatic petroleum fraction, such as n-hexane, heavy naphtha, etc. (boiling point: 80 to 150° C.) can be used.

A volume ratio (extraction solvent/solution) of the extraction solvent to the crude highly reactive modified phenolic resin solution is not specifically limited, but is normally from 10/90 to 90/10, preferably from 20/80 to 80/20.

According to the third treatment, the removal efficiency of the unreacted component becomes higher and the extraction solvent can be easily separated and removed after extraction.

In another treatment (fourth treatment) of the purification step (i), first, the reaction mixture or crude highly reactive modified phenolic resin obtained in the polycondensation reaction is allowed to stand in the heat-molten state.

By standing the crude highly reactive modified phenolic resin in the heated state, the unreacted component, component remained in the state of being insufficiently reacted and reaction solvent during the polycondensation reaction are separated as a supernatant from the modified phenolic resin.

In the fourth treatment, the crude highly reactive modified phenolic resin is maintained in the heated molten state at the temperature of normally 70 to 200° C., preferably 80 to 180° C., more preferably 80 to 150° C., and is allowed to stand for normally 15 minutes to 4 hours, preferably 20 minutes to 4 hours.

According to the fourth treatment, since the supernatant containing the unreacted component can be easily separated and removed from the highly reactive modified phenolic resin by decantation, there is an advantage that use of the solvent is not required in the removal of-the unreacted component.

In still another treatment (fifth treatment) of the purification step (i), the reaction mixture or crude highly reactive modified phenolic resin obtained by the polycondensation reaction is subjected to molecular distillation as it is under high vacuum of $10^{-7}$ to $10^{-4}$ mmHg to remove the unreacted component, component remained in the state of being insufficiently reacted and reaction solvent during the polycondensation reaction.

In the fifth treatment, since the highly reactive modified phenolic resin containing no unreacted component in a dry state can be directly obtained, there is an advantage that a separation process of, for example, a solvent containing the unreacted component is not required.

In the last example (sixth treatment) which can be applied in the purification step (i), first, the crude highly reactive modified phenolic resin is dissolved in a soluble solvent to prepare a reaction mixture solution.

Examples of the soluble solvent include the same organic solvents as those exemplified in the above first treatment, and mixed solvents of toluene and ketones, particularly a mixed solvent of toluene and methyl isobutyl ketone, are suitably used.

Then, the resulting solution is mixed with water and the solution is allowed to stand to form a three-layer solvent system composed of a highly reactive phenolic resin solution layer, a water layer and an unreacted oil layer, followed by removal of the unreacted oil layer and water layer.

According to the sixth treatment, since the unreacted oil layer is completely separated from the highly reactive modified phenolic resin layer via water, there is an advantage that the unreacted oil layer is certainly and easily and easily removed and, furthermore, the following purification step (ii) is easily performed because the acid catalyst is extracted in the water layer.

In the sixth treatment, the amount of the soluble solvent is adjusted so that a specific gravity of the highly reactive modified phenolic resin solution layer is larger than that of water. When the amount of the soluble solvent is too large, the specific gravity of the highly reactive modified phenolic resin is too small (i.e. less than 1) and the water layer unfavorably becomes a lower-most layer.

The first to sixth treatments of the purification step (i) may be performed alone or in combination thereof.

The modified phenolic resin wherein the unreacted substance is highly removed has an advantage that a weight loss by heating is not recognized and the reactivity with the epoxy resin is improved.

When the second treatment is not performed, the first treatment and the third to sixth treatments may be used in combination with a treatment of introducing the crude highly reactive modified phenolic resin as it is into a solvent containing at least one compound selected from the group consisting of aliphatic hydrocarbon having 10 carbon atoms or less, alicyclic hydrocarbon having 10 carbon atoms or less and aliphatic petroleum fraction.

According to the first treatment among the first to sixth treatments applied in the purification step (i), since the polycondensation reaction mixture and a specific extraction solvent are contacted each other at the temperature where this polycondensation reaction mixture is cabable of keeping a flow state to remove the unreacted substance in the above polycondensation reaction by extracting with an extraction solvent, the unreacted substance extraction conditions are easily set in comparison with, for example, the second treatment of introducing the polycondensation reaction product to deposit a solid. Furthermore, since the removal efficiency of the unreacted substance is high and no solvent is used, simplification of the unreacted substance extraction operation and cost reduction of purification of the modified phenolic resin can be performed.

In the above-described purification treatment (ii), he acid catalyst remained in the reaction mixture is removed to obtain a highly reactive phenolic resin containing substantially no acid.

When using an organic or inorganic acid as the acid catalyst, such a purification treatment (ii) is performed by washing the reaction mixture with water or washing with an aqueous alkali solution as it is or after dissolving in a specific solvent to remove a catalyst residue. According to washing-with the aqueous alkali solution, the unreacted phenols can also be removed, together with the acid catalyst.

The solvent in which the reaction mixture is dissolved is not specifically limited, and examples thereof include alcohol such as methyl alcohol and ethyl alcohol; ketones such as acetone, methyl ethyl ketone and methyl isobutyl ketone; ethers such as tetrahydrofuran, diethyl ether and methyl tert-butyl ether; aromatic compounds such as toluene and xylene; and a mixed solvent thereof.

Examples of the alkali used in the preparation of the aqueous alkali solution include sodium hydroxide, potassium hydroxide, magnesium hydroxide, calcium hydroxide, sodium hydrogencarbonate and the like.

In the purification treatment (ii), when using a solid acid as the acid catalyst, the catalyst residue can be easily removed by filtering the reaction mixture. In this purification treatment (ii), the reaction mixture may be dissolved in the above solvent to improve the operating property of processing such as filtration.

In the purification treatment (ii), when using oxalic acid as the acid catalyst, oxalic acid can be decomposed and removed by heating the reaction mixture at the temperature of 180° C. or more.

The above-described purification treatments (i) and (ii) can be performed in any order.

In the purification treatment (iii), the remained unreacted phenols are removed by performing steam distillation, blowing of nitrogen or vacuum distillation with or without removing the unreacted component, acid catalyst, etc. by subjecting the reaction mixture to the purification treatment (i) and/or purification treatment (ii). The removal of the unreacted phenols may be performed by any one of these methods or by using these methods in combination.

By removing the acid catalyst, unreacted substance and reaction solvent, which can be remained in the resin, with any of the purification treatments as described above, there can be obtained a highly reactive modified phenolic resin which has no corrosiveness to the metal, because it substantially contains no acid, and has improved heat resistance and improved dimensional stability because of improved reactivity with the epoxy resin. In the present specification, the term "substantially containing no acid" means that any acid are not remained, or it does not shows significant corrosiveness to the metal even if a trace amount of the acid exists.

The modified phenolic resin molding material of the present invention contains the highly reactive modified phenolic resin obtained by the process for producing the highly reactive modified phenolic resin according to the present invention, and an epoxy resin. The epoxy resin causes little molding shrinkage and is excellent in heat resistance, wear resistance, chemical resistance and electrical-insulating properties, and is optionally used in combination with a curing agent and/or a curing accelerator.

Examples of the epoxy resin include glycidyl ether type, glycidyl ester type, glycidylamine type, mixed type and alicyclic type epoxy resins.

More specifically, examples of the glycidyl ether type (phenolic) epoxy resin include bisphenol A type epoxy resin, biphenyl type epoxy resin, bisphenol F type epoxy resin, tetrabromobisphenol A type epoxy resin, tetraphenylolethane type epoxy resin, phenolic novolak type epoxy resin, o-cresylic novolak type epoxy resin, etc.;

examples of the glycidyl ether type (alocoholic) epoxy resin include polypropylene glycol type epoxy resin, hydrogenated bisphenol A type epoxy resin, etc.;

examples of the glycidyl ester type include hexahydrophthalic anhydride type epoxy resin, diner acid type epoxy resin, etc.;

examples of the glycidylamine type epoxy resin include diaminodiphenylmethane type epoxy resin, isocyanuric acid type epoxy resin, hydantoic acid type epoxy resin, etc.; and examples of the mixed type epoxy resin include p-aminophenol type epoxy resin, p-oxybenzoic acid type epoxy resin, etc. Among the above epoxy resins, bisphenol A type epoxy resin, biphenyl type epoxy resin, glycidylamine type epoxy resin and phenolic novolak type epoxy resin are preferable: Those prepared by using two or more epoxy resins in combination can also be used.

In the present invention, a mixing ratio of the highly reactive modified phenolic resin to the epoxy resin is not specifically limited, but is preferably from 10/90 to 90/10 (parts by weight), more preferably from 20/80 to 80/20 (parts by weight), based on the total of 100 parts by weight of the highly reactive modified phenolic resin and epoxy resin.

When the mixing ratio of the modified phenolic resin is less than 10 parts by weight, the heat resistance and moisture resistance of the resulting molded article are not sufficient. On the other hand, when it exceeds 90 parts by weight, the molding temperature is liable to become too high.

As the curing agent and/or curing accelerator used in the modified phenolic resin molding material of the present invention, there can be used various curing agents and curing accelerators used in curing of the epoxy resin. Examples of the curing agent include cyclic amines, aliphatic amines, polyamides, aromatic polyamines and acid anhydrides.

Specifically, examples of the cyclic amines include hexamethylenetetramine, etc.; and examples of the aliphatic amines include diethylenetriamine, triethylenetetramine, tetraethylenepentamine, diethylaminopropylamine, N-aminoethylpiperamine, isophoronediamine, bis(4-amino-3-methylcyclohexyl)methane, menthanediamine, etc.

Examples of the polyamides include vegetable oil fatty acid (dimer or trimer acid), aliphatic polyamine condensate, etc.; and examples of the aromatic polyamines include m-phenylenediamine, 4,4'-diaminodiphenylmethane, 4,4'-diaminodiphenylsulfone, m-xylenediamine, etc.

Examples of the acid anhydrides include phthalic anhydride, tetrahydrophthalic anhydride, hexahydrophthalic anhydride, trimellitic anhydride, pyromellitic anhydride, benzophenonetetracarboxylic anhydride, chlorendic anhydride, dodecynylsuccinic anhydride, methyltetrahydrophthalic anhydride, methylendomethylenetetrahydrophthalic anhydride, etc.

Examples of the curing accelerator include diazabicycloalkenes and derivatives thereof, such as 1,8-diazabicyclo(5,4,0)undecene-7, etc.; tertiary amines such as triethylenediamine, benzyldimethylamine, triethanolamine, dimethylaminoethanol, tris(dimethylaminomethyl)phenol, etc.; imidazoles such as 2-methylimidazole, 2-ethyl-4-methylimidazole, 2-phenylimidazole, 2-phenyl-4-methylimidazole, 2-heptadecylimidazole, etc.; organic phosphines such as tributylphosphine, methyldiphenylphosphine, triphenylphosphine, etc.; tetra-substituted phosphonium-tetra-substituted borates such as tetraphenylphosphonium tetraphenylborate, etc.; tetraphenylboron salts such as 2-ethyl-4-methylimidazole tetraphenylborate, N-methylmorpholine tetraphenolborate, etc.; Lewis acids such as boron trifluoride-amine complex, etc.; Lewis bases such as dicyanediamide, dihydrazide ii adipate, etc.; and polymercaptane, polysulfide, etc. These curing agents and curing accelerators may be used alone or in combination thereof.

The above modified phenolic resin molding material may further contain an inorganic filler, in addition to the above highly reactive modified phenolic resin and epoxy resin and, if necessary, curing and/or curing accelerator.

The strength and dimensional stability of the resulting molded article can be further improved by adding the inorganic filler to the resin molding material.

As the inorganic filler, there can be used various inorganic fillers which can be used as the inorganic filler or reinforcement in the plastic material, and examples thereof include fiber reinforcements such as glass fiber, carbon fiber, phosphor fiber and boron fiber; hydrated metal oxides such as aluminum hydroxide and magnesium hydroxide; metal carbonates such as magnesium carbonate and calcium carbonate; metal borates such as magnesium borate; and inorganic fillers such as silica, mica and fused silica.

The amount of the inorganic filler blended is not specifically limited, but is normally from 20 to 2000 parts by weight, preferably from 20 to 800 parts by weight, more preferably from 50 to 600 parts by weight, based on 100 parts by weight of the resin component prepared by adding the epoxy resin to the highly reactive modified phenolic resin.

The above modified phenolic resin molding material may further contain additives, if necessary. Examples of the additives include inner release agents such as silicone, wax; coupling agents; flame retardants; photostabilizers; antioxidants; pigments; and bulking agents.

The above-described modified phenolic resin molding material of the present invention is prepared by mixing the highly reactive modified phenolic resin and epoxy resin and, if necessary, curing agent and/or curing accelerator, inorganic filler and various additives, and is applied in the production of the molded article.

In the present invention, the mixing order of the highly reactive modified phenolic resin and epoxy resin, and optional components such as curing agent is not specifically limited. For example, a fine powdered molding powder (compound) can be prepared by kneading the highly reactive modified phenolic resin and epoxy resin, adding the curing agent (curing accelerator), sufficiently mixing them and optionally adding the inorganic filler and other additives, followed by mixing.

Specifically, such a compound can be prepared by the following procedures.

1) The highly reactive modified phenolic resin and epoxy resin are mixed with stirring at room temperature using an automatic mortar.

2) To the stirred mixture, other additives such as curing agent and/or curing accelerator, wax, etc. are added, followed by mixing.

3) The inorganic filler is added, followed by mixing.

4) After futher mixing for 3 to 10 minutes using rolls adjusted to 80 to 90° C. and returning to room temperature, followed by grinding the resultant mixture to form a compound.

In this case, the addition of the inorganic filler and other additives is performed separately after mixing the highly reactive modified phenolic resin and epoxy resin, but can also be performed at any time.

The modified phenolic resin molding material of the present invention can be formed into a molding material by various resin molding means which have hitherto been known. Examples of the molding means include compression molding, injection molding, extrusion molding, transfer molding and casting molding.

More specifically, when the molding article is produced by transfer molding using the modified phenolic resin molding material of the present invention, the molding conditions of a molding temperature of 120 to 200° C., an ejection pressure of 5 to 300 Kgf/cm$^2$, preferably 20 to 300 Kgf/cm$^2$, a clamping pressure of 50 to 250 Kgf/cm$^2$ and a molding time of 1 to 10 minutes are preferable.

The molded article thus molded is desirably post-cured by heating at the temperature of 150 to 300° C. for 0.5 to 24 hours.

The heat resistance of the molded article can be further improved by subjecting the molded article to post-curing.

In the modified phenolic resin molding material according to the present invention, since a highly reactive modified phenolic resin having low melt viscosity and high reactivity with the epoxy resin, and being improved in heat resistance, adhesion and low moisture absorption property is used, the moldability is good and the mechanical characteristics (e.g. dimensional stability, etc.), moisture resistance, heat resistance, adhesion and moisture absorption property of the resulting molded article are improved. In the modified phenolic resin molding material according to the present invention, when using a modified phenolic resin containing substantially no acid, the corrosiveness to the metal member can be lowered. In addition, the mechanical strength and electrical insulating properties of the molded article can also be improved by adding inorganic fillers.

Accordingly, this modified phenolic resin molded article is useful as electrical/electronic parts, such as printed board, insulating material, sealing material, etc., and is also useful as semiconductor sealing materials on which improvements of thermal resistance, dimensional stability as a measure for stress damage caused by high integration, and moisture absorption property are demanded.

EFFECT OF THE INVENTION

According to the first to sixth processes of producing the highly reactive modified phenolic resin of the present invention, the molecular weight lowerly step, which was essential in a conventional method, can be eliminated and it is possible to produce in one step a highly reactive modified phenolic resin having a low resin melt viscosity and high reactivity with the epoxy resin, and exhibiting particularly excellent adhesion and low moisture absorption property, when the aromatic hydrocarbon compound is added to the raw materials.

According to the first to sixth processes of producing the highly reactive modified phenolic resin of the present invention, a highly reactive modified phenolic resin having above-described excellent characteristics can be stably and economically supplied by using a polycondensation raw oil capable of being stably and efficiently supplied and advantageous in view of the cost, that is, a distilled oil having the specific physical properties and being obtained by the catalytic cracking step or thermal cracking step in the petroleum refining process, without subjecting to a treatment such as vacuum distillation, etc.

According to the processes of producing the highly reactive modified phenolic resin of the present invention, it is possible to produce a highly reactive modified phenolic resin which has low resin melt viscosity and high reactivity with the epoxy resin and shows excellent heat resistance, adhesion and low moisture absorption property, and which has no corrosiveness because it substantially contains no acid, by subjecting the highly reactive modified phenolic resin obtained by the polycondensation reaction to a purification treatment to remove the unreacted component, acid catalyst, etc.

The modified phenolic resin molding material of the present invention contains the highly reactive modified phenolic resin obtained by the process of the present invention and epoxy resin, and can provide a molding material capable of producing a molded article having good moldability, excellent mechanical characteristics (e.g. dimensional stability, etc.), excellent moisture resistance and heat resistance, particularly electrical/electronic parts and semiconductor sealing materials.

EXAMPLES

The following Examples further illustrate the present invention in detail but are not to be construed to limit the scope thereof.

In the following Examples, "parts" are by weight unless otherwise stated. The properties of the raw oil used as the reaction raw material are shown in the following Table 1 to Table 3.

TABLE 1

| Kind of raw oil | Raw oil X |
|---|---|
|  | Fluid catalytic cracking bottom distillate |
| Average molecular weight | 251 |
| Boiling point (° C.) | 254 to 468 |
| Fraction of aromatic hydrocarbon (fa) | 0.70 |
| Hydrogen content of aromatic ring (Ha) (%) | 33 |

Note:
Average molecular weight: value measured according to vapor pressure osmometory
Boiling point: value of ° C. in terms of the atmospheric pressure, measured according to ASTM D-1160
Raw oil X: obtained by distilling column bottom oil prepared by fluid catalytic cracking (FCC) of vacuum gas oil

TABLE 2

|  | Raw oil A | Raw oil B | Raw oil C | Raw oil D | Raw oil E |
|---|---|---|---|---|---|
| Process | FCC | FCC | FCC | Delayed coaker | Flexicoaker |
| Raw oil for the process | Desulfurized vacuum heavy gas oil | Desulfurized vacuum heavy gas oil | Desulfurized vacuum heavy gas oil | Topped crude oil | Topped crude oiol |
|  | Desulfurized heavy oil | Desulfurized heavy oil | Desulfurized heavy oil | Vacuum bottom oil | Vacuum bottom oil |
|  |  |  | Topped crude oil |  | Tar sand |
| Average molecular weight | 250 | 235 | 224 | 226 | 248 |

TABLE 2-continued

|  | Raw oil A | Raw oil B | Raw oil C | Raw oil D | Raw oil E |
|---|---|---|---|---|---|
| Boiling point (° C.) | 196 to 455 | 206 to 470 | 222 to 437 | 193 to 483 | 264 to 463 |
| Fraction of aromatic hydrocarbon (fa) | 0.48 | 0.51 | 0.61 | 0.62 | 0.67 |
| Hydrogen content of aromatic ring (Ha) (%) | 51 | 47 | 29 | 32 | 27 |

Note:
Average molecular weight: value measured according to vapor pressure osmometory
Boiling point: value of ° C. in terms of the atmospheric pressure, measured according to ASTM D-1160

TABLE 3

|  | Raw oil P | Raw oil Q | Raw oil R | Raw oil S |
|---|---|---|---|---|
| Average molecular weight (VPO) | 138 | 148 | 165 | 213 |
| Boiling Point (° C.) | 200 to 300 | 200 to 360 | 200 to 420 | 210 to 355 |

Note:
Average molecular weight: value measured according to vapor pressure osmometory
Boiling point: value of ° C. in terms of the atmospheric pressure, measured according to ASTM D-1160
Raw oil P-S: obtained by refining high-temperature tar obtained from coke oven tar to prepare each boiling point fraction The number-average molecular weight, reactivity with the epoxy resin (judged by the gelation time: the shorter, the higher the reactivity), resin melt viscosity and hydroxyl group equivalent measured in the following Examples were measured by the following devices or measuring methods.

<Number-average molecular weight>

Measuring device: GPC device HLC-8020 (column: TSK gel 3000HXL+TSK gel 2500HXL X 3, standard substance: polystyrene) manufactured by Toso Corporation The molecular weight was calculated from the resulting data, using polystyrene as the standard substance.

<Glass transition temperature>

Measuring system: dynamic viscoelasticity method

Measuring device: DVE RHEOSPECTOLER DVE-4V type, manufactured by Rheology Co., Ltd.

Loading system: tensile loading

Measuring frequency: 10 Hz

Heating rate: 5° C./min.

Dynamic measuring displacement: +5×10$^{-4}$ cm

Test piece: 4 mm in width×1 mm in thickness×30 mm in span

<Hydroxyl group equivalent>

Measured according to an acetylation chloride method.

<ICI viscosity>

Measured by using an ICI corn plate viscometer manufactured by ICI Co.

<Gelation time>

Measured at 170° C. according to JIS K 6910.

<Heating weight loss>

A weighed sample (10 g) was put in a constant temperature bath kept at a predetermined temperature and maintained for 2 hours, and then a weight ratio of the sample before and after subjecting to a high-temperature treatment was determined and was taken as a heating weight loss.

<Shore hardness immediately after molding>

Measured by using a Shore hardness tester.

<Flexural strength and modulus>

Measured according to JIS K 6911.

<Peal strength>

Measured according to JIS K 6481.

<Moisture absorption rate>

A molded article was made according to JIS K 7209 and a difference in weight of the molded article before and after treating under predetermined conditions was determined.

EXAMPLE 1

100 g of a raw oil X and 150 g of phenol were charged in a 1 liter glass reaction vessel, and the mixture was maintained at 40° C. while stirring at a rate of 250 to 350 rpm. After the temperature of the mixture during stirring became stable, a mixture of formalin (aqueous 37 wt % solution) (116.2 g) and sulfuric acid (97wt %, 53.1 g) was added dropwise over 20 minutes with paying attention to an increase in temperature. After the completion of the dropwise addition, the reaction was continued with maintaining the temperature at 95° C. for 100 minutes to obtain a reaction product.

The above reaction product was dissolved by introducing into 450 ml of a toluene/methyl isobutyl ketone (mixing ratio: 2/1) mixed solvent and the resulting resin mixed solution was washed with distilled water to remove an acid, and then the mixed solvent was removed by using an evaporator. Thereafter, the unreacted phenol was removed by steam distillation and water was then removed by blowing nitrogen to obtain 242 g of a crude highly reactive modified phenolic resin.

Then, the crude highly reactive modified phenolic resin in the heated molten state was poured into 4800 ml of n-hexane to remove the unreacted raw oil and to deposit a resin, which was filtered and dried to obtain 203 g of a highly reactive modified phenolic resin.

The number-average molecular weight, melt viscosity at 150° C. and hydroxyl group equivalent of the resulting highly reactive modified phenolic resin were measured. The results are shown in Table 4, together with the reaction conditions.

EXAMPLES 2 to 5

The highly reactive modified phenolic resin in the yield shown in Table 4 were obtained in the same manner as in Example 1, except that the reaction conditions were changed as shown in Table 4.

The number-average molecular weight, melt viscosity at 150° C. and hydroxyl group equivalent of the resulting highly reactive modified phenolic resins were measured. The results are shown in Table 4, together with the reaction conditions.

EXAMPLE 6

100 g of a raw oil X, 150 g of phenol and 80 g of formalin (aqueous 37 wt % solution) were charged in a 1 liter glass reaction vessel, and the mixture was maintained at 40° C. while stirring at a rate of 250 to 350 rpm. After the temperature of the mixture became stable, sulfuric acid (97 wt %, 37 g) was added dropwise over 14 minutes with paying attention to an increase in temperature. After the completion of the dropwise addition, the reaction was continued with maintaining the temperature at 95° C. for 106 minutes to obtain a reaction product.

The above reaction product was dissolved by introducing into 450 ml of a toluene/methyl isobutyl ketone (mixing ratio: 2/1) mixed solvent and the resulting resin mixed solution was washed with distilled water to remove an acid, and then the mixed solvent and unreacted phenols were removed by using an evaporator to obtain 197 g of a crude highly reactive modified phenolic resin.

Then, the crude highly reactive modified phenolic resin in the heat-molten state was poured into 5200 ml of n-hexane to remove the unreacted raw oil and to deposit a resin, which was filtered and dried to obtain 173 g of a highly reactive modified phenolic resin.

Properties of the resulting highly reactive modified phenolic resin are shown in Table 4, together with the reaction conditions.

EXAMPLE 7

The highly reactive modified phenolic resin in the yield shown in Table 4 was obtained in the same manner as in Example 1, except that the reaction conditions were changed as shown in Table 4.

Properties of the resulting highly reactive modified phenolic resin are shown in Table 4, together with the reaction conditions.

EXAMPLE 8

9.58 parts by weight of the highly reactive modified phenolic resin obtained in Example 1 and 14.48 parts by weight of a biphenyl type epoxy resin (trade name YX-4000H, manufactured by Yuka Shell Epoxy Co., Ltd.) were mixed with stirring at room temperature using an automatic mortar, and 0.49 parts by weight of triphenylphosphine (TPP) as a curing catalyst was then added to obtain a curing accelerator-containing resin mixture.

The gelation time of this curing accelerator-containing resin mixture was measured. The resulting gelation time is shown in Table 5.

0.25 parts by weight of carnauba wax was further added to the resulting compound, and 0.20 parts by weight of carbon black and 75 parts by weight of a fused silica (CRS1102-GT200T, manufactured by Tatsumori Co., Ltd.) as an inorganic filler were then added, followed by mixing. The resulting mixture was further mixed by using rolls adjusted to 80 to 90° C. for 3 to 10 minutes, cooled to room temperature and then ground to obtain a compound (molding material). The formulation composition of this compound is shown in Table 5.

The resulting compound was subjected to transfer molding under the conditions of 175° C. for 90 seconds and further post-cured at 175° C. for 6 hours to obtain a molded article.

The Shore hardness immediately after molding, glass transition temperature, flexural characteristics and moisture absorption rate of the resulting compound were measured. The results are shown in Table 5.

EXAMPLES 9 to 14

The curing accelerator-containing resin mixtures, the compounds and the molded articles were produced in the same manner as in Example 8, except that the highly reactive modified phenolic resins obtained in Examples 2 to 7 were used in place of the highly reactive modified phenolic resin obtained in Example 1, respectively and that the formulation ratios of the highly reactive modified phenolic resins to the epoxy resin were changed to the values shown in Table 5.

The gelation time of each resulting curing accelerator-containing resin mixtures and physical properties of the molded articles are shown in Table 5.

TABLE 4

|  |  | Example 1 | Example 2 | Example 3 |
|---|---|---|---|---|
| Raw oil | (g) | 100 | 200 | 100 |
| Phenol | (g) | 150 | 150 | 206 |
| Formalin (37 wt %) | (g) | 116 | 80 | 136 |
| Acid catalyst | (g) | 53 | 37 | 62 |
| Kind of acid catalyst | — | sulfuric acid | sulfuric acid | sulfuric acid |
| Reaction temperature | (° C.) | 95 | 95 | 95 |
| Reaction time | (min.) | 120 | 120 | 120 |
| Dropping mode | — | sulfuric acid/ formalin | sulfuric acid/ formalin | sulfuric acid/ formalin |
| Yield (based on raw oil) | (wt %) | 203 | 198 | 250 |
| Viscosity at 150° C. (ICI viscometer) | (p) | 5.2 | 0.3 | 1.4 |
| Number-average molecular weight (GPC) | — | 580 | 244 | 420 |
| Hydroxyl group equivalent | (g/eq) | 129 | 147 | 126 |

|  |  | Example 4 | Example 5 | Example 6 | Example 7 |
|---|---|---|---|---|---|
| Raw oil | (g) | 100 | 100 | 100 | 100 |
| Phenol | (g) | 263 | 263 | 150 | 151 |
| Formalin (37 wt %) | (g) | 181 | 165 | 80 | 80 |
| Acid catalyst | (g) | 85 | 74 | 37 | 14 |
| Kind of acid catalyst | — | sulfuric acid | sulfuric acid | sulfuric acid | sulfuric acid |
| Reaction temperature | (° C.) | 95 | 95 | 95 | 95 |
| Reaction time | (min.) | 120 | 120 | 360 | 120 |
| Dropping mode | — | sulfuric acid/ formalin | sulfuric acid/ formalin | sulfuric acid | sulfuric acid |
| Yield (based on raw oil) | (wt %) | 338 | 331 | 173 | 166 |
| Viscosity at 150° C. (ICI viscometer) | (p) | 1.3 | 1.0 | 0.6 | 0.4 |
| Number-average molecular weight (GPC) | — | 481 | 392 | 284 | 320 |
| Hydroxyl group equivalent | (g/eq) | 119 | 121 | 137 | 137 |

TABLE 5

|  |  |  | Ex. 8 | Ex. 9 | Ex. 10 |
|---|---|---|---|---|---|
| Modified phenolic | Example 1 | pbw | 9.58 |  |  |
|  | Example 2 | pbw |  | 10.35 |  |

TABLE 5-continued

| resin | Example 3 | pbw | | | 9.46 |
|---|---|---|---|---|---|
| | Example 4 | pbw | | | |
| | Example 5 | pbw | | | |
| | Example 6 | pbw | | | |
| | Example 7 | pbw | | | |
| Epoxy resin | YX-4000H | pbw | 14.48 | 13.71 | 14.60 |
| Curing accelerator | TPP | pbw | 0.49 | 0.49 | 0.49 |
| Fused silica | CRS1102-GT200T | pbw | 75 | 75 | 75 |
| Carnauba wax | | pbw | 0.25 | 0.25 | 0.25 |
| Carbon black | | pbw | 0.20 | 0.20 | 0.20 |
| Gelation time | | (170° C./SEC) | 41 | 43 | 37 |
| Shore hardness immediately after molding | | — | 72 | 70 | 72 |
| Glass transition temperature (Tg) | | (° C.) | 129 | 126 | 128 |
| Flexural Strength | Room temperature | (kgf/mm$^2$) | 14.2 | 13.3 | 14.5 |
| Flexural modulus | Room temperature | (kgf/mm$^2$) | 1690 | 1630 | 1700 |
| Moisture absorption rate | 85° C./85%-72 hr | (wt %) | 0.24 | 0.22 | 0.24 |
| | 85° C./85%-168 hr | (wt %) | 0.33 | 0.31 | 0.34 |

| | | | Ex. 11 | Ex. 12 | Ex. 13 | Ex. 14 |
|---|---|---|---|---|---|---|
| Modified phenolic resin | Example 1 | pbw | | | | |
| | Example 2 | pbw | | | | |
| | Example 3 | pbw | | | | |
| | Example 4 | pbw | 9.12 | | | |
| | Example 5 | pbw | | 9.21 | | |
| | Example 6 | pbw | | | 9.94 | |
| | Example 7 | pbw | | | | 9.94 |
| Epoxy resin | YX-4000H | pbw | 14.94 | 14.85 | 14.12 | 14.12 |
| Curing accelerator | TPP | pbw | 0.49 | 0.49 | 0.49 | 0.49 |
| Fused silica | CRS1102-GT200T | pbw | 75 | 75 | 75 | 75 |
| Carnauba wax | | pbw | 0.25 | 0.25 | 0.25 | 0.25 |
| Carbon black | | pbw | 0.20 | 0.20 | 0.20 | 0.20 |
| Gelation time | | (170° C./SEC) | 35 | 34 | 41 | 41 |
| Shore hardness immediately after molding | | — | 76 | 75 | 73 | 73 |
| Glass transition temperature (Tg) | | (° C.) | 139 | 140 | 127 | 128 |
| Flexural strength | Room temperature | (kgf/mm$^2$) | 16.1 | 15.7 | 14.0 | 14.0 |
| Flexural modulus | Room temperature | (kgf/mm$^2$) | 1750 | 1730 | 1710 | 1720 |
| Moisture absorption rate | 85° C./85%-72 hr | (wt %) | 0.26 | 0.26 | 0.21 | 0.21 |
| | 85° C./85%-168 hr | (wt %) | 0.35 | 0.35 | 0.32 | 0.31 |

*pbw: parts by weight

EXAMPLE 15

100 g of a raw oil X, 263 g of phenol, 164 g of formalin (aqueous 37 wt % solution) and 11 g of sulfuric acid (97 wt %) were charged in a 1 liter glass reaction vessel, and the mixture was heated to 95° C. over 20 minutes while stirring at a rate of 250 to 350 rpm and reacted with maintaining at 95° C. for 100 minutes to obtain a reaction product.

The above reaction product was purified in the same manner as in Example 1, except that the unreacted phenol was removed by nitrogen blowing at 160° C. to obtain 290 g of a crude phenolic resin, and the crude phenolic resin in the heat-molten state was poured into 6000 ml of n-hexane.

Properties of the resulting highly reactive modified phenolic resin are shown in Table 6, together with the reaction conditions.

EXAMPLE 16

100 g of a raw oil X, 206 g of phenol, 136 g of formalin (aqueous 37 wt % solution) and 70 g of Daiya-ion SK1B (manufactured by Mitsubishi Chemical Co., Ltd.) as an acidic ion exchange resin were charged in a 1 liter glass reaction vessel, and the mixture was heated to 120° C. over 20 minutes while stirring at a rate of 250 to 350 rpm and reacted with maintaining at 120° C. for 280 minutes to obtain a reaction product.

The above reaction product was filtered by using a metal mesh of 60 mesh to remove Daiya-ion SK1B. The resulting resin was subjected to steam distillation at 160° C., to remove the unreacted phenol and water was then removed by blowing nitrogen to obtain 234 g of a crude highly reactive modified phenolic resin.

Then, the crude highly reactive modified phenolic resin in the heat-molten state was poured into 4800 ml of n-hexane to remove the unreacted raw oil and to deposit a resin, which was filtered and dried to obtain 215 g of a highly reactive modified phenolic resin.

Properties of the resulting highly reactive modified phenolic resin are shown in Table 6, together with the reaction conditions.

EXAMPLE 17

A paraffin component and a component having low reactivity in 120 g of a raw oil X shown in Table 1 were removed according to ASTM-D-2549. Active alumina gel (manufactured by Wako Pure Pharmaceutical Industries Co., Ltd.) and silica gel (manufactured by Fuji Dewinson Co., Ltd.) were used for a column, and n-pentane, diethyl ether, chloroform and ethyl alcohol were used as a developer.

100 g of the raw oil obtained above, 263 g of phenol, 181 g of formalin (aqueous 37 wt % solution) and 11 g of sulfuric acid (97 wt % by weight) were charged in a 1 liter glass reaction vessel, and the mixture was heated to 95° C. over 20 minutes while stirring at a rate of 250 to 350 rpm and reacted with maintaining at 95° C. for 100 minutes to obtain a reaction product.

The above reaction product was dissolved by introducing in 450 ml of a toluene/methyl isobutyl ketone (mixing ratio: 2/1) mixed solvent and the resulting resin mixed solution was washed with distilled water to remove an acid, and then the mixed solvent was removed by using an evaporator. Furthermore, the unreacted phenol was removed by blowing nitrogen at 160° C. to obtain 267 g of a crude highly reactive modified phenolic resin.

Properties of the resulting highly reactive modified phenolic resin are shown in Table 6, together with the reaction conditions.

EXAMPLES 18 to 20

Curing accelerator-containing resin mixtures, the compounds and molded articles were obtained in the same manner as in Example 8, except that the highly reactive modified phenolic resin obtained in Examples 15 to 17 were used.

The composition, properties, etc. are shown in Table 7.

TABLE 6

|  |  | Example 15 | Example 16 | Example 17 |
|---|---|---|---|---|
| Raw oil | (g) | 100 | 100 | 100 |
| Phenol | (g) | 263 | 206 | 263 |
| Formalin (37 wt %) | (g) | 164 | 136 | 181 |
| Acid catalyst | (g) | 11 | 70 | 11 |
| Kind of acid catalyst | — | sulfuric acid | Daiya-ion SK1B | sulfuric acid |
| Reaction temperature | (° C.) | 95 | 120 | 95 |
| Reaction time | (min.) | 120 | 300 | 120 |
| Yield (based on raw oil) | (wt %) | 264 | 215 | 267 |
| Viscosity at 150° C. (ICI viscometer) | (p) | 2.2 | 2.1 | 1.9 |
| Number-average molecular weight (GPC) | — | 473 | 461 | 487 |
| Hydroxyl group equivalent | (g/eq) | 118 | 123 | 119 |

TABLE 7

|  |  |  | Ex. 18 | Ex. 19 | Ex. 20 |
|---|---|---|---|---|---|
| Modified phenolic resin | Example 15 | pbw | 9.07 |  |  |
|  | Example 16 | pbw |  | 9.31 |  |
|  | Example 17 | pbw |  |  | 9.12 |
| Epoxy resin | YX-4000H | pbw | 14.99 | 14.75 | 14.94 |
| Curing accelerator | TPP | pbw | 0.49 | 0.49 | 0.49 |
| Fused silica | CRS1102-GT200T | pbw | 75 | 75 | 75 |
| Carnauba wax |  | pbw | 0.25 | 0.25 | 0.25 |
| Carbon black |  | pbw | 0.20 | 0.20 | 0.20 |
| Gelation time |  | (170° C./SEC) | 35 | 36 | 35 |
| Shore hardness immediately after molding |  | — | 75 | 73 | 75 |
| Glass transition temperature (Tg) |  | (° C.) | 136 | 134 | 136 |
| Flexural strength | Room temperature | (kgf/mm$^2$) | 15.9 | 15.5 | 16.1 |
| Flexural modulus | Room temperature | (kgf/mm$^2$) | 1750 | 1700 | 1730 |
| Moisture absorption rate | 85° C./85%-72 hr | (wt %) | 0.24 | 0.24 | 0.24 |
|  | 85° C./85%-168 hr | (wt %) | 0.34 | 0.33 | 0.34 |

*pbw: parts by weight

EXAMPLE 21

100 g of a raw oil X, 263 g of phenol and 100 g of m-xylene were charged into a 1 liter glass reaction vessel, and the mixture was maintained at 40° C. while stirring at a rate of 250 to 350 rpm. After the temperature became stable, a mixture of formalin (aqueous 37 wt % solution) (164 g) and sulfuric acid (97 wt %, 74 g) was added dropwise over 20 minutes, with paying attention to an increase in temperature. After the completion of the dropwise addition, the reaction was performed with maintaining the temperature at 95° C. for 100 minutes to obtain a reaction product.

The above reaction product was purified in the same manner as in Example 15, except that, after the nitrogen blowing, 342 g of a crude phenolic resin was obtained and the crude phenolic resin was poured into 7000 ml of n-hexane.

Properties of the resulting highly reactive modified phenolic resin are shown in Table 8, together with the reaction conditions.

EXAMPLE 22

100 g of a raw oil X, 206 g of phenol, 100 g of m-xylene and 70 g of Daiya-ion SK1B (manufactured by Mitsubishi Chemical Co., Ltd.,) were charged into a 1 liter glass reaction vessel, and the mixture was maintained at 40° C. while stirring at a rate of 250 to 350 rpm. After the temperature became stable, 136 g of formalin (aqueous 37 wt % solution) was added dropwise over 20 minutes, with paying attention to an increase in temperature. After the completion of the dropwise addition, the reaction was performed with maintaining the temperature at 120° C. for 280 minutes to obtain a reaction product.

The above reaction product was filtered by using a metal mesh of 60 mesh to remove Daiya-ion SK1B. The unreacted phenol was removed by blowing nitrogen into the resulting resin at 160° C. to obtain 282 g of a crude highly reactive modified phenolic resin.

Then, the crude highly reactive modified phenolic resin in the heat-molten state was poured into 7000 ml of n-hexane to remove the unreacted oil and to deposit a resin, which was filtered and dried to obtain 256 g of a highly reactive modified phenolic resin.

Properties of the resulting highly reactive modified phenolic resin are shown in Table 8, together with the reaction conditions.

EXAMPLE 23

100 g of the raw oil X wherein the paraffin component and component having low reactivity were removed in the same manner as in Example 17, 263 g of phenol and 100 g of m-xylene were charged into a 1 liter glass reaction vessel, and the mixture was maintained at 40° C. while stirring at a rate of 250 to 350 rpm. After the temperature became stable, a mixture of formalin (aqueous 37 wt % solution)(181 g) and sulfuric acid (97 wt %, 85 g) was added dropwise over 20 minutes, with paying attention to an increase in temperature. After the completion of the dropwise addition, the reaction was performed with maintaining the temperature at 95° C. for 100 minutes to obtain a reaction product.

The above reaction product was purified in the same manner as in Example 17 to obtain 314 g of a highly reactive modified phenolic resin.

Properties of the resulting highly reactive modified phenolic resin are shown in Table 8, together with the reaction conditions.

EXAMPLE 24 TO 26

Curing accelerator-containing resin mixtures, the compounds and molded articles were obtained in the same manner as in Example 8, except that the highly reactive modified phenolic resins obtained in Examples 21 to 23 were used.

The compositions, properties, etc. are shown in Table 9.

TABLE 8

|  |  | Example 21 | Example 22 | Example 23 |
|---|---|---|---|---|
| Raw oil | (g) | 100 | 100 | 100 |
| Phenol | (g) | 263 | 206 | 263 |
| Formalin | (g) | 164 | 136 | 181 |
| m-xylene | (g) | 100 | 100 | 100 |

TABLE 8-continued

|  |  | Example 21 | Example 22 | Example 23 |
|---|---|---|---|---|
| Acid catalyst | (g) | 74 | 70 | 85 |
| Kind of acid catalyst | — | sulfuric acid | Daiya-ion SI1B | sulfuric acid |
| Reaction temperature | (° C.) | 95 | 120 | 95 |
| Reaction time | (min.) | 120 | 300 | 120 |
| Yield (based on raw oil) | (wt %) | 311 | 256 | 314 |
| Viscosity at 150° C. (ICI viscometer) | (p) | 1.0 | 1.3 | 1.2 |
| Number-average molecular weight (GPC) | — | 402 | 424 | 466 |
| Hydroxyl group equivalent | (g/eq) | 123 | 130 | 125 |

TABLE 9

|  |  |  | Ex. 24 | Ex. 25 | Ex. 26 |
|---|---|---|---|---|---|
| Modified phenolic resin | Example 21 | pbw | 9.31 |  |  |
|  | Example 22 | pbw |  | 9.62 |  |
|  | Example 23 | pbw |  |  | 9.40 |
| Epoxy resin | YX-4000H | pbw | 14.75 | 14.44 | 14.66 |
| Curing accelerator | TPP | pbw | 0.49 | 0.49 | 0.49 |
| Fused silica | CRS1102-GT200T | pbw | 75 | 75 | 75 |
| Carbauba wax |  | pbw | 0.25 | 0.25 | 0.25 |
| Carbon black |  | pbw | 0.20 | 0.20 | 0.20 |
| Gelation time |  | (170° C./SEC) | 35 | 38 | 43 |
| Shore hardness immediately after molding |  | — | 75 | 73 | 72 |
| Glass transition temperature (Tg) |  | (° C.) | 136 | 135 | 129 |
| Peel strength |  | (kgf/cm) | 2.3 | 2.3 | 2.2 |
| Flexural strength | Room temperature | (kgf/mm²) | 15.8 | 15.7 | 14.2 |
| Flexural modulus | Room temperature | (kgf/mm²) | 1710 | 1720 | 1700 |
| Moisture absorption rate | 85° C./85%-72 hr | (wt %) | 0.25 | 0.24 | 0.25 |
|  | 85° C./85%-168 hr | (wt %) | 0.34 | 0.33 | 0.34 |

*pbw: parts by weight

EXAMPLE 27

100 g of a raw oil X and 206 g of phenol were charged into a 1 liter glass reaction vessel, and the mixture was maintained at 40° C. while stirring at a rate of 250 to 350 rpm. After the temperature became stable, a mixture of formalin (aqueous 37 wt % by weight solution) (136.4 g) and sulfuric acid (97 wt % by weight, 62.3 g) was added dropwise over 20 minutes, with paying attention to an increase in temperature. After the completion of the dropwise addition, the reaction was performed with maintaining at 95° C. for 100 minutes to obtain a reaction product.

The above reaction product was dissolved in 450 ml of a toluene/methyl isobutyl ketone (mixing ratio: 2/1) mixed solvent and the resulting resin mixed solution was washed with distilled water to remove an acid and then concentrated by using an evaporator until the solvent concentration became 10% by weight, thereby to obtain a resin varnish.

Then, the resin varnish was poured into 5800 ml of n-hexane to remove the unreacted raw oil and to deposit a resin, which was filtered to obtain 273 g of a crude highly reactive modified phenolic resin.

Furthermore, the resulting crude highly reactive modified phenolic resin was subjected to steam distillation at 160° C. to remove the unreacted phenol, and water was removed by blowing nitrogen to obtain 236 g of a highly reactive modified phenolic resin.

Properties of the resulting highly reactive modified phenolic resin are shown in Table 10, together with the reaction conditions.

EXAMPLE 28

100 g of a raw oil X, 263 g of phenol and 73 g of an acidic ion exchange resin Dia-ion SK1B (manufactured by Mitsubishi Chemical Co., Ltd.,) were charged into a 1 liter glass reaction vessel, and the mixture was maintained at 40° C. while stirring at a rate of 250 to 350 rpm.

After the temperature became stable, 164.8 g of formalin (aqueous 37 wt % by weight solution) was added dropwise over 20 minutes, with paying attention to an increase in temperature. After the completion of the dropwise addition, the reaction was performed with maintaining at 120° C. for 280 minutes to obtain a reaction product.

The above reaction product was dissolved by introducing into 450 ml of dimethyl sulfoxide, and the resin mixed solution was filtered by using a metal mesh of 60 mesh to remove the used ion exchange resin.

The resin mixed solution was subjected to liquid-liquid extraction using 350 ml of heavy naphtha having a boiling point of 80 to 150° C. in a separating funnel to remove the unreacted raw oil, thereby obtaining a crude highly reactive modified phenolic resin.

Furthermore, the resulting crude highly reactive modified phenolic resin was subjected to steam distillation at 160° C. to remove dimethyl sulfoxide and the unreacted phenol, and water was removed by blowing nitrogen to obtain 203 g of a highly reactive modified phenolic resin.

Properties of the resulting highly reactive modified phenolic resin are shown in Table 10, together with the reaction conditions.

EXAMPLE 29

A crude highly reactive modified phenolic resin obtained in the same manner as in Example 6 was subjected to steam distillation at 160° C. to remove the unreacted phenol, and then water was removed by blowing nitrogen at the same temperature to obtain 197 g of a crude highly reactive modified phenolic resin.

Then, the crude highly reactive modified phenolic resin in the heat-molten state was cooled to 120° C. and then allowed to stand at the same temperature to remove the unreacted raw oil separated in the upper layer, thereby obtaining 178 g of a highly reactive modified phenolic resin.

Properties of the resulting highly reactive modified phenolic resin are shown in Table 10, together with the reaction conditions.

EXAMPLE 30

100 g of the raw oil X obtained in the same manner as in Example 17, wherein a paraffin component and a component having low reactivity were removed, and 263 g of phenol were charged into a 1 liter glass reaction vessel, and the mixture was maintained at 40° C. while stirring at a rate of 250 to 350 rpm. After the temperature became stable, a mixture of formalin (aqueous 37 wt % solution)(165 g) and sulfuric acid (97 wt %, 73.7 g) was added dropwise over 20 minutes, with paying attention to an increase in temperature. After the completion of the dropwise addition, the reaction was performed with maintaining at 95° C. for 100 minutes to obtain a reaction product.

The above reaction product was dissolved by introducing into 450 ml of a toluene/methyl isobutyl ketone (mixing ratio: 2/1) mixed solvent and the resulting resin mixed solution was washed with distilled water to remove an acid, and then the mixed solvent and unreacted phenol were removed by using an evaporator to obtain 242 g of a crude highly reactive modified phenolic resin.

Then, the resulting crude highly reactive modified phenolic resin was subjected to molecular distillation to obtain 212 g of a highly reactive modified phenolic resin.

Properties of the resulting highly reactive modified phenolic resin are shown in Table 10, together with the reaction conditions.

EXAMPLE 31

100 g of a raw oil X and 263 g of phenol were charged into a 1 liter glass reaction vessel, and the mixture was maintained at 40° C. while stirring at a rate of 250 to 350 rpm. After the temperature became stable, a mixture of formalin (aqueous 37 wt % solution) (164.8 g) and sulfuric acid (97 wt % by weight, 73.74 g) was added dropwise over 20 minutes, with paying attention to an increase in temperature. After the completion of the dropwise addition, the reaction was performed with maintaining at 95° C. for 100 minutes to obtain a reaction product.

The above reaction product was dissolved by introducing into 450 ml of a toluene/methyl isobutyl ketone (mixing ratio: 2/1) mixed solvent and the resulting resin mixed solution was washed with an aqueous 0.3 wt % sodium hydroxide solution to remove an acid and the unreacted phenol, and then concentrated by using an evaporator until the solvent concentration became 10% by weight, thereby to obtain a resin varnish.

Then, the resin varnish was poured into 5800 ml of n-hexane to remove the unreacted raw oil and to deposit a resin, which was filtered and dried to obtain 190 g of a highly reactive modified phenolic resin.

Properties of the resulting highly reactive modified phenolic resin are shown in Table 10, together with the reaction conditions.

EXAMPLE 32

100 g of a raw oil X and 263 g of phenol were charged into a 1 liter glass reaction vessel, and the mixture was maintained at 40° C. while stirring at a rate of 250 to 350 rpm. After the temperature became stable, a mixture of formalin (aqueous 37 wt % solution) (164 g) and sulfuric acid (97 wt %, 74 g) was added dropwise over 20 minutes, with paying attention to an increase in temperature. After the completion of the dropwise addition, the reaction was performed with maintaining at 95° C. for 100 minutes to obtain a reaction product.

The above reaction product was dissolved in 300 ml of a toluene/methyl isobutyl ketone (mixing ratio: 2/1) mixed solvent, and aqueous sulfuric acid was removed. The resulting resin mixed solution was transferred to a separating funnel to which 333 ml of distilled water was added, and the solution was shaken and separated in an organic layer containing the unreacted oil, a resin solution layer and a water layer. Then, the organic layer containing the unreacted oil and water layer were removed.

The resulting resin solution layer was washed with distilled water to remove an acid, and then the mixed solvent and unreacted phenol were removed by using an evaporator to obtain 335 g of a highly reactive modified phenolic resin.

Properties of the resulting highly reactive modified phenolic resin are shown in Table 10, together with the reaction conditions.

EXAMPLES 33 TO 38

Curing accelerator-containing resin mixtures, compounds and molded articles were produced in the same manner as in Example 8, except that the highly reactive modified phenolic resin obtained in Examples 27 to 32 and a phenolic novolak type epoxy resin (trade name EOCN-1020, manufactured by Nippon Kayaku Co., LTD.) were used.

The compositions, properties, etc. are shown in Table 11.

TABLE 10

|  |  | Example 27 | Example 28 | Example 29 |
|---|---|---|---|---|
| Raw oil | (g) | 100 | 100 | 100 |
| Phenol | (g) | 206 | 263 | 150 |
| Formalin (37 wt %) | (g) | 136 | 165 | 80 |
| Acid catalyst | (g) | 62 | 73 | 37 |
| Kind of acid catalyst | — | sulfuric acid | SK1B | sulfuric acid |
| Reaction temperature | (° C.) | 95 | 120 | 95 |
| Reaction time | (min.) | 120 | 280 | 106 |
| Dropping mode | — | sulfuric acid/formalin | formalin | sulfuric acid |
| Yield (based on raw oil) | (wt %) | 236 | 203 | 178 |
| Viscosity at 150° C. (ICI viscometer) | (p) | 1.6 | 1.1 | 0.6 |
| Number-average molecular weight (GPC) | — | 413 | 367 | 295 |
| Hydroxyl group equivalent | (g/eq) | 126 | 120 | 136 |

|  |  | Example 30 | Example 31 | Example 32 |
|---|---|---|---|---|
| Raw oil | (g) | 100 | 100 | 100 |
| Phenol | (g) | 263 | 263 | 263 |
| Formalin (37 wt %) | (g) | 165 | 165 | 104 |
| Acid catalyst | (g) | 74 | 74 | 74 |
| Kind of acid catalyst | — | sulfuric acid | sulfuric acid | sulfuric acid |
| Reaction temperature | (° C.) | 95 | 95 | 95 |
| Reaction time | (min.) | 120 | 120 | 100 |
| Dropping mode | — | sulfuric acid/formalin | sulfuric acid/formalin | sulfuric acid/formalin |
| Yield (based on raw oil) | (wt %) | 212 | 100 | 341 |
| Viscosity at 150° C. (ICI viscometer) | (p) | 1.3 | 2.1 | 0.9 |
| Number-average molecular weight (GPC) | — | 382 | 458 | 396 |
| Hydroxyl group equivalent | (g/eq) | 119 | 129 | 118 |

TABLE 11

| | | | Ex. 33 | Ex. 34 | Ex. 35 |
|---|---|---|---|---|---|
| Modified phenolic resin | Example 27 | pbw | 9.48 | | |
| | Example 28 | pbw | | 9.20 | |
| | Example 29 | pbw | | | 9.93 |
| | Example 30 | pbw | | | |
| | Example 31 | pbw | | | |
| | Example 32 | pbw | | | |
| Epoxy resin | EOCN1020 | pbw | 14.82 | 15.10 | 14.37 |
| Curing accelerator | TPP | pbw | 0.25 | 0.25 | 0.25 |
| Fused silica | CRS1102-GT200T | pbw | 75 | 75 | 75 |
| Carnauba wax | | pbw | 0.25 | 0.25 | 0.25 |
| Carbon black | | pbw | 0.20 | 0.20 | 0.20 |
| Gelation time | | (170° C./SEC) | 42 | 46 | 48 |
| Shore hardness immediately after molding | | — | 75 | 73 | 72 |
| Glass transition temperature (Tg) | | (° C.) | 167 | 165 | 160 |
| Flexural strength | Room temperature | (kgf/mm$^2$) | 17.9 | 18.0 | 16.0 |
| Flexural modulus | Room temperature | (kgf/mm$^2$) | 1850 | 1900 | 1870 |
| Moisture absorption rate | 85° C./85%-72 hr | (wt %) | 0.25 | 0.23 | 0.22 |
| | 85° C./85%-168 hr | (wt %) | 0.34 | 0.33 | 0.35 |

| | | | Ex. 36 | Ex. 37 | Ex. 38 |
|---|---|---|---|---|---|
| Modified phenolic resin | Example 27 | pbw | | | |
| | Example 28 | pbw | | | |
| | Example 29 | pbw | | | |
| | Example 30 | pbw | 9.15 | | |
| | Example 31 | pbw | | 9.52 | |
| | Example 32 | pbw | | | 9.10 |
| Epoxy resin | EOCN1020 | pbw | 16.15 | 14.68 | 15.20 |
| Curing accelerator | TPP | pbw | 0.25 | 0.25 | 0.25 |
| Fused silica | CRS1102-GT200T | pbw | 75 | 75 | 75 |
| Carnauba wax | | pbw | 0.25 | 0.25 | 0.25 |
| Carbon black | | pbw | 0.20 | 0.20 | 0.20 |
| Gelation time | | (170° C./SEC) | 41 | 44 | 38 |
| Shore hardness immediately after molding | | — | 75 | 79 | 77 |
| Glass transition temperature (Tg) | | (° C.) | 162 | 161 | 162 |
| Flexural strength | Room temperature | (kgf/mm$^2$) | 18.0 | 17.6 | 17.9 |
| Flexural modulus | Room temperature | (kgf/mm$^2$) | 1850 | 1890 | 1900 |
| Moisture absorption rate | 85° C./85%-72 hr | (wt %) | 0.25 | 0.26 | 0.25 |
| | 85° C./85%-168 hr | (wt %) | 0.35 | 0.39 | 0.35 |

*pbw: parts by weight

EXAMPLE 39

100 g of the raw oil A obtained in the same manner as in Example 17, wherein a paraffin component and a component having low reactivity were removed, 114.4 g of phenol and 26.4 g of paraformaldehyde were charged into a 1 liter glass reaction vessel, and the mixture was maintained at 40° C. while stirring at a rate of 250 to 350 rpm. After the temperature became stable, 10 g of oxalic acid was added and the mixture was heated to 140° C. over 30 minutes. After heating to 140° C., the reaction was performed with stirring at the same temperature for 90 minutes, to obtain a reaction product.

The above reaction product was dissolved by introducing into 190 ml of a mixed solvent prepared by mixing toluene and acetone in a proportion of 7:3, and the resulting resin mixed solution was washed by adding 140 ml of distilled water to remove an acid remained in the resin mixed solution. The mixed solvent was removed from the resulting acid-removed resin mixed solution using an evaporator to obtain a crude highly reactive modified phenolic resin.

Furthermore, the unreacted phenol remained in the resin was removed by blowing nitrogen into the resin at 155° C. for 30 minutes, to obtain 158.3 g of a highly reactive modified phenolic resin.

Properties of the resulting highly reactive modified phenolic resin are shown in Table 12, together with the reaction conditions.

EXAMPLE 40

100 g of a raw oil A, 16.3 g of phenol, 2.6 g of paraformaldehyde and 1.4 g of oxalic acid were charged into a 1 liter glass reaction vessel, and the mixture was heated to 140° C. while stirring at a rate of 250 to 350 rpm over 30 minutes. After heating to 140° C., the reaction was performed with stirring at the same temperature for 90 minutes, to obtain a reaction product.

Then, the reaction product was allowed to stand and be cooled to room temperature and the unreacted raw oil separated in the upper layer was removed by decantation to obtain a crude highly reactive modified phenolic resin.

The unreacted phenol remained in the above crude highly reactive modified phenolic resin was removed by blowing nitrogen into the resin at 155° C. for 30 minutes. Furthermore, the temperature was raised to 180° C. under a nitrogen atmosphere and, after maintaining for 1 hour, the temperature was lowered to room temperature to obtain 26 g of a highly reactive modified phenolic resin.

Properties of the resulting highly reactive modified phenolic resin are shown in Table 12, together with the reaction conditions.

EXAMPLE 41

100 g of a raw oil A, 114.4 g of phenol and 18.5 g of paraformaldehyde were charged into a 1 liter glass reaction vessel, and the mixture was maintained at 40° C. while stirring at a rate of 250 to 350 rpm. After the temperature became stable, 1.4 g of oxalic acid was added and the mixture was heated to 100° C. over 15 minutes. After heating to 100° C., 1.4 g of oxalic acid was further added. Then, the temperature was raised to 140° C. over 15 minutes and the reaction was performed for 90 minutes, to obtain a reaction product.

The above reaction product was introduced into a heavy naphtha to remove the unreacted raw oil.

The unreacted phenol remained in the above crude highly reactive modified phenolic resin thus obtained was removed by steam distillation at 155° C. Then, the temperature was raised to 180° C. under a nitrogen atmosphere and, after maintaining for 1 hour, the temperature was lowered to room temperature to obtain 72 g of a highly reactive modified phenolic resin.

Properties of the resulting highly reactive modified phenolic resin are shown in Table 12, together with the reaction conditions.

EXAMPLE 42

100 g of a raw oil A, 62.4 g of phenol and 12 g of paraformaldehyde were charged into a 1 liter glass reaction vessel, and the mixture was maintained at 40° C. while stirring at a rate of 250 to 350 rpm. After the temperature became stable, 1.4 g of oxalic acid was added and the mixture was heated to 140° C. over 30 minutes. After heating to 140° C., the reaction was performed with stirring at the same temperature for 90 minutes, to obtain a reaction product.

The above reaction product was purified in the same manner as in Example 40 to obtain 35 g of a highly reactive modified phenolic resin.

Properties of the resulting highly reactive modified phenolic resin are shown in Table 12, together with the reaction conditions.

EXAMPLE 43

100 g of a raw oil B, 100 g of phenol, 19.7 g of paraformaldehyde and 1.3 g of oxalic acid were charged into a 1 liter glass reaction vessel, and the mixture was heated to 140° C. while stirring at a rate of 250 to 350 rpm over 30 minutes. After heating to 140° C., the reaction was performed with stirring at the same temperature for 90 minutes, to obtain a reaction product.

The above reaction product was allowed to stand and cooled to 50° C. and the unreacted raw oil separated in the upper layer was removed by decantation to obtain a crude highly reactive modified phenolic resin.

The above crude highly reactive modified phenolic resin was subjected to vacuum distillation until phenol is not distilled and, furthermore, nitrogen was blown at 155° C. to remove the unreacted phenol.

To the resin thus obtained, 100 ml of a heavy naphtha was added and the mixture was stirred under reflux at 100° C. for 30 minutes to extract the unreacted raw oil remained in the resin. Then, the heavy naphtha containing the unreacted raw oil was removed by decantation to remove the unreacted raw oil remained in the resin, the temperature was further raised to 180° C. under a nitrogen atmosphere and, after maintaining for 1 hour, the temperature was lowered to room temperature to obtain 71 g of a highly reactive modified phenolic resin.

Properties of the resulting highly reactive modified phenolic resin are shown in Table 12, together with the reaction conditions.

EXAMPLE 44

100 g of a raw oil B, 100 g of phenol and 1.4 g of oxalic acid were charged into a 1 liter glass reaction vessel, and the mixture was maintained at 40° C. while stirring at a rate of 250 to 350 rpm. After the temperature became stable, 7 g of paraformaldehyde was added and heating was started. After the temperature reached 70° C., 7 g of paraformaldehyde was further added and the temperature was raised to 90° C.. After the temperature reached 90° C., 5.7 g of paraformaldehyde and 1.3 g of oxalic acid were added and the temperature was raised to 100° C., and then the reaction was performed while stirring at the same temperature for 100 minutes, to obtain a reaction product.

The above reaction product was subjected to vacuum (40 mmHg) distillation until phenol was not distilled and, furthermore, nitrogen was blown at 155° C. to remove the unreacted phenol.

The resin thus obtained was treated with a heavy naphtha to remove the unreacted raw oil remained in the resin, and the temperature was further raised to 180° C. under a nitrogen atmosphere. After maintaining for 1 hour, the temperature was lowered to room temperature to obtain 76 g of a highly reactive modified phenolic resin.

Properties of the resulting highly reactive modified phenolic resin are shown in Table 12, together with the reaction conditions.

EXAMPLE 45

100 g of a raw oil C, 121.6 g of phenol, 29.3 g of paraformaldehyde and 1.3 g of oxalic acid were charged into a 1 liter glass reaction vessel, and the mixture was heated to 100° C. while stirring at a rate of 250 to 350 rpm over 20 minutes. After heating to 100° C., the reaction was performed while stirring at the same temperature for 100 minutes, to obtain a reaction product.

The above reaction product was dissolved by adding 190 ml of acetonitrile, and then 190 ml of a heavy naphtha was added to the resulting resin mixed solution to extract and remove the unreacted oil remained in the resin mixed solution.

The acetonitrile was removed from the resulting acid-removed resin mixed solution by using an evaporator to obtain a crude highly reactive modified phenolic resin.

The above crude highly reactive modified phenolic resin was subjected to vacuum distillation at 185° C. to remove the unreacted phenol and, after maintaining at the same temperature for 1 hour while blowing nitrogen, the temperature was lowered to room temperature to obtain 98 g of a highly reactive modified phenolic resin.

Properties of the resulting highly reactive modified phenolic resin are shown in Table 12, together with the reaction conditions.

EXAMPLE 46

100 g of a raw oil C, 121.6 g of o-cresol, 29.7 g of paraformaldehyde and 1.33 g of paratoluenesulfonic acid were charged into a 1 liter glass reaction vessel, and the mixture was heated to 100° C. over 20 minutes, while stirring at a rate of 250 to 350 rpm. After heating to 100° C., the reaction was performed while stirring at the same temperature for 100 minutes, to obtain a reaction product.

The above reaction product was dissolved by introducing into 190 ml of methyl isobutyl ketone, and then 140 ml of distilled water was added to the resulting resin mixed solution to remove an acid remained in the resin mixed solution.

The resulting acid-removed resin mixed solution was concentrated by using an evaporator until the resin concentration became 60% by weight, and the resulting resin solution was introduced into a heavy naphtha to remove the unreacted raw oil remained in the resin.

The unreacted o-cresol remained in the above crude highly reactive modified phenolic resin was removed by blowing nitrogen into the resin at 155° C. for 30 minutes to obtain 123 g of a highly reactive modified phenolic resin.

Properties of the resulting highly reactive modified phenolic resin are shown in Table 12, together with the reaction conditions.

EXAMPLE 47

100 g of a raw oil D, 126.4 g of phenol, 20.4 g of paraformaldehyde and 11.2 g of oxalic acid were charged into a 1 liter glass reaction vessel, and the mixture was heated to 160° C. over 30 minutes while stirring at a rate of 250 to 350 rpm. After heating to 160° C., the reaction was performed while stirring at the same temperature for 90 minutes, to obtain a reaction product.

The above reaction product was treated in the same manner in Example 46 to obtain 88 g of a highly reactive modified phenolic resin.

Properties of the resulting highly reactive modified phenolic resin are shown in Table 12, together with the reaction conditions.

EXAMPLE 48

100 g of a raw oil E, 283.0 g of α-naphthol, 79.0 g of paraformaldehyde and 15.3 g of an acidic ion exchange resin Dia-ion SK1B (manufactured by Mitsubishi Chemical Co., Ltd.) were charged into a 1 liter glass reaction vessel, and the mixture was heated to 100° C. over 20 minutes while stirring at a rate of 250 to 350 rpm.

After heating to 100° C., the reaction was performed while stirring at the same temperature for 100 minutes, to obtain a reaction product.

The above reaction product was filtered by using a metal mesh of 60 mesh to remove the used ion exchange resin, and then allowed to stand and be cooled to room temperature. Then, the unreacted raw oil separated in the upper layer was removed by decantation to obtain a crude highly reactive modified phenolic resin.

The above crude highly reactive modified phenolic resin was subjected to steam distillation at 155° C. for 30 minutes and the unreacted α-naphthol remained in the resin was removed by further blowing nitrogen at the same temperature for 10 minutes to obtain 224 g of a highly reactive modified phenolic resin.

Properties of the resulting highly reactive modified phenolic resin are shown in Table 12, together with the reaction conditions.

EXAMPLE 49 TO 58

Curing accelerator-containing resin mixtures, compounds an molded articles were produced in the same manner as in Example 8, except that the highly reactive modified phenolic resins obtained in Examples 39 to 48 and an ortho-cresol novolak type epoxy resin (trade name: EOCN1020, manufactured by Nippon Kayaku Co., Ltd) or a bisphenol type epoxy resin (YX-4000M) were used.

The compositions, properties, etc. are shown in Table 13.

TABLE 12

|  |  | Ex. 39 | Ex. 40 | Ex. 41 | Ex. 42 | Ex. 43 |
|---|---|---|---|---|---|---|
| Raw oil | (g) | 100 | 100 | 100 | 100 | 100 |
| Kind of raw oil | — | A* | A | A | A | B |
| Phenols    phenol | (g) | 114.4 | 16.3 | 114.4 | 62.4 | 100.0 |
|     o-Cresol |  |  |  |  |  |  |
|     α-Naphthol |  |  |  |  |  |  |
| Formaldehyde compound | (g) | 26.4 | 2.6 | 18.5 | 12.0 | 19.7 |
| Acid catalyst | (g) | 10.0 | 1.4 | 2.8 | 1.4 | 1.3 |
| Kind of acid catalyst | — | Oxalic acid | Oxalic acid | Oxalic acid | Oxalic acid | Oxalic acid |
| Reaction temperature | (° C.) | 140 | 140 | 140 | 140 | 140 |
| Reaction time | (min.) | 120 | 120 | 120 | 120 | 120 |
| Yield (based on raw oil) | (wt %) | 158.3 | 26 | 72 | 35 | 71 |
| Viscosity at 150° C. (ICI viscometer) | (p) | 2.5 | 10 or more | 0.7 | 2.3 | 1.3 |
| Number-average molecular weight | — | 707 | 650 | 538 | 644 | 684 |
| Hydroxy group equivalent | (g/eq) | 127 | 175 | 132 | 141 | 132 |
|  |  | Ex. 44 | Ex. 45 | Ex. 46 | Ex. 47 | Ex. 48 |
| Raw oil | (g) | 100 | 100 | 100 | 100 | 100 |
| Kind of raw oil | — | B | C | C | D | E |
| Phenols    phenol | (g) | 100.0 | 121.6 |  | 126.4 |  |
|     o-Cresol |  |  |  | 121.6 |  |  |
|     α-Naphthol |  |  |  |  |  | 283.0 |
| Formaldehyde compound | (g) | 19.7 | 29.3 | 29.7 | 20.4 | 79.0 |
| Acid catalyst | (g) | 2.7 | 1.3 | 1.3 | 11.2 | 15.3 |
| Kind of acid catalyst | — | Oxalic acid | Oxalic acid | PTS | Oxalic acid | SK1B |
| Reaction temperature | (° C.) | 100 | 100 | 100 | 160 | 100 |
| Reaction time | (min.) | 110 | 120 | 120 | 120 | 360 |
| Yield (based on raw oil) | (wt %) | 76 | 98 | 123 | 88 | 224 |
| Viscosity at 150° C. (ICI viscometer) | (p) | 2.0 | 4.9 | 8.4 | 0.6 | 10.0 |
| Number-average molecular weight | — | 659 | 843 | 959 | 503 | 926 |
| Hydroxy group equivalent | (g/eq) | 128 | 129 | 139 | 131 | 152 |

A*: Free from paraffin

TABLE 13

|  |  |  | Ex. 49 | Ex. 50 | Ex. 51 |
|---|---|---|---|---|---|
| Modified phenolic resin | Example 39 | pbw | 9.53 |  |  |
|  | Example 40 | pbw |  | 11.42 |  |
|  | Example 41 | pbw |  |  | 9.72 |
|  | Example 42 | pbw |  |  |  |
|  | Example 43 | pbw |  |  |  |
|  | Example 44 | pbw |  |  |  |
|  | Example 45 | pbw |  |  |  |
|  | Example 46 | pbw |  |  |  |
|  | Example 47 | pbw |  |  |  |
|  | Example 48 | pbw |  |  |  |
| Epoxy resin | YX-4000H | pbw |  |  | 14.34 |
|  | EOCN-1020 | pbw | 14.77 | 12.88 |  |
| Curing accelerator | TPP | pbw | 0.25 | 0.25 | 0.49 |

TABLE 13-continued

|  |  |  | | | |
|---|---|---|---|---|---|
| Fused silica | CRS1102-GT200T | pbw | 75 | 75 | 75 |
| Carnauba wax | | pbw | 0.25 | 0.25 | 0.25 |
| Carbon black | | pbw | 0.20 | 0.20 | 0.20 |
| Gelation time | | (170° C./SEC) | 38 | 40 | 39 |
| Shore hardness immediately after molding | | — | 88 | 83 | 75 |
| Glass transition temperature (Tg) | | (° C.) | 176 | 169 | 142 |
| Flexural strength | Room temperature | (kgf/mm$^2$) | 17.9 | 17.5 | 15.9 |
| Flexural modulus | Room temperature | (kgf/mm$^2$) | 1890 | 1870 | 1840 |
| Moisture absorption rate | 85° C./85%-72 hr | (wt %) | 0.25 | 0.23 | 0.26 |
|  | 85° C./85%-168 hr | (wt %) | 0.34 | 0.31 | 0.36 |

|  |  |  | Ex. 52 | Ex. 53 | Ex. 54 |
|---|---|---|---|---|---|
| Modified phenolic resin | Example 39 | pbw | | | |
|  | Example 40 | pbw | | | |
|  | Example 41 | pbw | | | |
|  | Example 42 | pbw | 10.11 | | |
|  | Example 43 | pbw | | 9.72 | |
|  | Example 44 | pbw | | | 9.57 |
|  | Example 45 | pbw | | | |
|  | Example 46 | pbw | | | |
|  | Example 47 | pbw | | | |
|  | Example 48 | pbw | | | |
| Epoxy resin | YX-4000H | pbw | 13.95 | 14.34 | |
|  | EOCN-1020 | pbw | | | 14.73 |
| Curing accelerator | TPP | pbw | 0.49 | 0.49 | 0.25 |
| Fused silica | CRS1102-GT200T | pbw | 75 | 75 | 75 |
| Carnauba wax | | pbw | 0.25 | 0.25 | 0.25 |
| Carbon black | | pbw | 0.20 | 0.20 | 0.20 |
| Gelation time | | (170° C./SEC) | 40 | 41 | 38 |
| Shore hardness immediately after molding | | — | 73 | 73 | 89 |
| Glass transition temperature (Tg) | | (° C.) | 142 | 143 | 173 |
| Flexural strength | Room temperature | (kgf/mm$^2$) | 16.7 | 17.7 | 18.3 |
| Flexural modulus | Room temperature | (kgf/mm$^2$) | 1850 | 1870 | 1900 |
| Moisture absorption rate | 85° C./85%-72 hr | (wt %) | 0.24 | 0.25 | 0.25 |
|  | 85° C./85%-168 hr | (wt %) | 0.33 | 0.33 | 0.32 |

|  |  |  | Ex. 55 | Ex. 56 | Ex. 57 | Ex. 58 |
|---|---|---|---|---|---|---|
| Modified phenolic resin | Example 39 | pbw | | | | |
|  | Example 40 | pbw | | | | |
|  | Example 41 | pbw | | | | |
|  | Example 42 | pbw | | | | |
|  | Example 43 | pbw | | | | |
|  | Example 44 | pbw | | | | |
|  | Example 45 | pbw | 9.62 | | | |
|  | Example 46 | pbw | | 10.13 | | |
|  | Example 47 | pbw | | | 9.67 | |
|  | Example 48 | pbw | | | | 10.54 |
| Epoxy resin | YX-4000H | pbw | | | 14.39 | 13.52 |
|  | EOCN-1020 | pbw | 14.68 | 14.17 | | |
| Curing accelerator | TPP | pbw | 0.25 | 0.25 | 0.49 | 0.49 |
| Fused silica | CRS1102-GT200T | pbw | 75 | 75 | 75 | 75 |
| Carnauba wax | | pbw | 0.25 | 0.25 | 0.25 | 0.25 |
| Carbon black | | pbw | 0.20 | 0.20 | 0.20 | 0.20 |
| Gelation time | | (170° C./SEC) | 38 | 35 | 39 | 41 |
| Shore hardness immediately after molding | | — | 88 | 90 | 75 | 74 |
| Glass transition temperature (Tg) | | (° C.) | 171 | 172 | 145 | 147 |
| Flexural strength | Room temperature | (kgf/mm$^2$) | 18.4 | 18.7 | 17.9 | 18.0 |
| Flexural modulus | Room temperature | (kgf/mm$^2$) | 1910 | 1920 | 1870 | 1880 |
| Moisture absorption rate | 85° C./85%-72 hr | (wt %) | 0.25 | 0.23 | 0.24 | 0.19 |
|  | 85° C./85%-168 hr | (wt %) | 0.32 | 0.31 | 0.33 | 0.29 |

*pbw: parts by weight

EXAMPLE 59

100 g of a petroleum raw oil B, 94 g of phenol, 18.5 g of paraformaldehyde and 2.5 g of oxalic acid were charged into a 1 liter glass reaction vessel, and the mixture was maintained at 40° C. while stirring at a rate of 250 to 350 rpm and heated to 140° C. over 30 minutes. Then, the reaction was performed while maintaining at the same temperature for 90 minutes, to obtain a reaction product.

The above reaction product was dissolved by introducing into 161 ml of methyl isobutyl ketone and the resulting resin mixed solution was washed with distilled water to remove an acid. Then, the mixed solvent was removed by using an evaporator to obtain 160 g of a crude highly reactive modified phenolic resin.

To the resulting crude highly reactive modified phenolic resin, 160 ml of a heavy naphtha was added and the mixture was heated to about 98° C. and stirred for 30 minutes. After cooling to room temperature, the heavy naphtha layer containing the unreacted oil, which was separated as the upper layer, was removed by decantation. A series of unreacted oil extraction removing operations using the heavy naphtha were performed one more time under the same conditions.

Then, the unreacted phenol was removed by dissolving the resin layer as the lower layer at about 150° C. and blowing nitrogen to obtain 65 g of a highly reactive modified phenolic resin.

Properties of the resulting highly reactive modified phenolic resin are shown in Table 14, together with the reaction conditions.

EXAMPLE 60

The highly reactive modified phenolic resin was obtained in the same manner as in Example 59, except that the reaction conditions were changed as shown in Table 14, and the reaction product was dissolved in 182 ml of methyl isobutyl ketone, to obtain 167 g of a crude highly reactive modified phenolic resin.

Properties of the resulting highly reactive modified phenolic resin are shown in Table 14, together with the reaction conditions.

EXAMPLE 61

100 g of a petroleum raw oil B, 114 g of phenol, 18.5 g of paraformaldehyde and 2.8 g of oxalic acid were charged into a 1 liter glass reaction vessel, and the mixture was maintained at 40° C. while stirring at a rate of 250 to 350 rpm and heated to 140° C. over 30 minutes. Then, the reaction was performed while maintaining at the same temperature for 90 minutes, to obtain a reaction product.

The above reaction product was dissolved by introducing into 182 ml of a mixed solvent of methyl isobutyl ketone and toluene (7:1) and the resulting resin mixed solution was washed with distilled water to remove an acid. Then, the mixed solvent was removed by using an evaporator to obtain 175 g of a crude highly reactive modified phenolic resin.

To the resulting highly reactive crude modified phenolic resin, 350 ml of n-heptane was added and the mixture was heated to about 85° C. and stirred for 30 minutes. After cooling to room temperature, the n-heptane layer containing the unreacted oil, which was separated as the upper layer, was removed by decantation.

Then, the unreacted phenol was removed by dissolving the resin layer as the lower layer at about 150° C., followed by steam distillation to obtain 77 g of a highly reactive modified phenolic resin.

Properties of the resulting highly reactive modified phenolic resin are shown in Table 14, together with the reaction conditions.

EXAMPLE 62

The highly reactive modified phenolic resin was obtained in the same manner as in Example 59, except that the reaction conditions were changed as shown in Table 14, the heated mixture of 160 g of the obtained crude modified phenolic resin with the heavy naphtha was cooled to 80° C., and unreacted phenol was removed by steam distillation.

Properties of the resulting highly reactive modified phenolic resin are shown in Table 14, together with the reaction conditions.

EXAMPLE 63

100 g of a petroleum raw oil X, 122 g of phenol, 25.4 g of paraformaldehyde and 1.3 g of oxalic acid were charged in a 1 liter glass reaction vessel, and the mixture was maintained at 40° C. while stirring at a rate of 250 to 350 rpm and heated to 100° C. over 30 minutes. Then, the reaction was performed while maintaining at the same temperature for 90 minutes, to obtain a reaction product.

The above reaction product was dissolved by introducing into 180 ml of a mixed solvent of methyl isobutyl ketone and toluene (7:3) and the resulting resin mixed solution was washed with distilled water to remove an acid. Then, the mixed solvent was removed by using an evaporator to obtain 200 g of a crude highly reactive modified phenolic resin.

To the resulting crude highly reactive modified phenolic resin, 400 ml of n-octane was added and the mixture was heated to about 90° C. and stirred for 30 minutes. After cooling to 80° C., the n-octane layer containing the unreacted oil, which was separated as the upper layer by standing at the same temperature, was removed by decantation.

Then, the unreacted phenol was removed by dissolving the resin layer as the lower layer at about 150° C. and blowing nitrogen to obtain 92 g of a highly reactive modified phenolic resin.

Properties of the resulting highly reactive modified phenolic resin are shown in Table 14, together with the reaction conditions.

EXAMPLE 64

100 g of a coal raw oil S, 100 g of phenol, 19.7 g of paraformaldehyde and 1.3 g of oxalic acid were charged into a 1 liter glass reaction vessel, and the mixture was maintained at 40° C. while stirring at a rate of 250 to 350 rpm and heated to 140° C. over 30 minutes. Then, the reaction was performed while maintaining at the same temperature for 90 minutes, to obtain a reaction product.

The above reaction product was dissolved by introducing into 161 ml of methyl isobutyl ketone and the resulting resin mixed solution was washed with distilled water to remove an acid. Then, the mixed solvent was removed by using an evaporator to obtain 160 g of a highly reactive crude modified phenolic resin.

To the resulting crude highly reactive modified phenolic resin, 320 ml of a heavy naphtha was added and the mixture was heated to about 98° C. and stirred for 30 minutes. After cooling to 80° C., the heavy naphtha layer containing the unreacted oil, which was separated as the upper layer by standing at the same temperature, was removed by decantation.

Then, the unreacted phenol was removed by dissolving the resin layer as the lower layer at about 150° C., followed by steam distillation to obtain 51 g of a highly reactive modified phenolic resin.

Properties of the resulting highly reactive modified phenolic resin are shown in Table 14, together with the reaction conditions.

EXAMPLE 65

The highly reactive modified phenolic resin was obtained in the same manner as in Example 59, except that the reaction conditions were changed as shown in Table 14, the reaction product was dissolved in 170 ml of methyl isobutyl ketone, to obtain 169 g of a crude phenolic resin, and the heated mixture of the crude phenolic resin with the kerosene was cooled to 80° C.

Properties of the resulting highly reactive modified phenolic resin are shown in Table 14, together with the reaction conditions.

EXAMPLE 66

100 g of a petroleum raw oil B, 114 g of o-cresol, 18.5 g of paraformaldehyde and 2.8 g of oxalic acid were charged into a 1 liter glass reaction vessel, and the mixture was maintained at 40° C. while stirring at a rate of 250 to 350 rpm and heated to 140° C. over 30 minutes. Then, the reaction was performed while maintaining at the same temperature for 90 minutes, to obtain a reaction product.

The above reaction product was dissolved by introducing into 190 ml of a mixed solvent of toluene and acetone (7:3) and the resulting resin mixed solution was washed with distilled water to remove an acid. Then, the mixed solvent was removed by using an evaporator to obtain 174 g of a crude highly reactive modified phenolic resin.

To the resulting highly reactive crude modified phenolic resin, 350 ml of a heavy naphtha was added and the mixture was heated to about 98° C. and stirred for 30 minutes. After cooling to 80° C., the heavy naphtha layer containing the unreacted oil, which was separated as the upper layer by standing at the same temperature, was removed by decantation.

Then, the unreacted o-cresol was removed by dissolving the resin layer as the lower layer at about 150° C., followed by steam distillation to obtain 79 g of a highly reactive modified phenolic resin.

Properties of the resulting highly reactive modified phenolic resin are shown in Table 14, together with the reaction conditions.

EXAMPLE 67

The highly reactivie modified phenolic resin was obtained in the same manner as in Example 66, except that the reaction conditions were changed as shown in Table 14, the reaction product was dissolved in 200 ml of the mixed solvent, to obtain 197 g of a crude phenolic resin.

Properties of the resulting highly reactive modified phenolic resin are shown in Table 14, together with the reaction conditions.

COMPARATIVE EXAMPLE 1

100 g of a petroleum raw oil B, 94 g of phenol, 18.5 g of paraformaldehyde and 2.5 g of oxalic acid were charged into a 1 liter glass reaction vessel, and the mixture was maintained at 40° C. while stirring at a rate of 250 to 350 rpm and heated to 140° C. over 30 minutes. Then, the reaction was performed while maintaining at the same temperature for 90 minutes, to obtain a reaction product.

The above reaction product was dissolved by introducing 161 ml of methyl isobutyl ketone, and the resulting resin mixed solution was washed with distilled water to remove an acid and the mixed solvent was removed by using an evaporator. Then, the unreacted phenol was removed by steam distillation and water was further removed by blowing nitrogen to obtain 148 g of a crude highly reactive modified phenolic resin.

Then, the crude highly reactive modified phenolic resin in the heat-molten state was poured into 3200 ml of a heavy naphtha of a temperature of about 10° C. to dissolve the unreacted oil into the heavy naphtha and to deposit the resin. The resulting resin was filtered and dried to obtain 78 g of a highly reactive modified phenolic resin.

Properties of the resulting highly reactive modified phenolic resin are shown in Table 14, together with the reaction conditions.

TABLE 14

| | | | Ex. 59 | Ex. 60 | Ex. 61 |
|---|---|---|---|---|---|
| Reaction conditions | | | | | |
| Raw oil | Petroleum raw oil B | (g) | 100 | 100 | 100 |
| | Petroleum raw oil X | (g) | — | — | — |
| | Coal tar S | (g) | — | — | — |
| Phenols | Phenol | (g) | 94 | 114 | 114 |
| | o-cresol | (g) | — | — | — |
| | β-naphthol | (g) | — | — | — |
| Paraformaldehyde | | (g) | 18.5 | 18.5 | 18.5 |
| Acid catalyst | | (g) | 2.5 | 10 | 2.8 |
| Reaction temperature | | (° C.) | 140 | 140 | 140 |
| Reaction time | | (min.) | 120 | 120 | 120 |
| Extraction conditions | | | | | |
| Used solvent | | — | Heavy naphtha | Heavy naphtha | n-heptane |
| Amount of solvent | | (ml/Extraction times) | 160 | 167 | 350 |
| Stirring temperature | | (° C.) | 98 | 80 | 85 |
| Stirring time | | (min.) | 30 | 30 | 30 |
| Number of extraction | | (times) | 2 | 2 | 1 |
| Properties | | | | | |
| Yield (based on raw oil) | | % by weight | 65 | 73 | 77 |
| Retention of unreacted product | | (%) | 0.9 | 1.1 | 1.3 |
| Viscoscity at 150° C. (ICI viscometer) | | (p) | 1.3 | 0.9 | 1.0 |

TABLE 14-continued

| | | | | | |
|---|---|---|---|---|---|
| Number-average molecular weight | | — | 713 | 634 | 629 |
| Hydroxyl group equivalent | | (g/equivalent) | 133 | 129 | 130 |
| Heating weight loss | (105° C.) | % by weight | 0.09 | 0.05 | 0.08 |
| | (150° C.) | % by weight | 0.57 | 0.40 | 0.44 |

| | | | Ex. 62 | Ex. 63 | Ex. 64 |
|---|---|---|---|---|---|
| Reaction conditions | | | | | |
| Raw oil | Petroleum raw oil B | (g) | — | — | — |
| | Petroleum raw oil X | (g) | 100 | 100 | — |
| | Coal tar S | (g) | — | — | 100 |
| Phenols | Phenol | (g) | 100 | 122 | 100 |
| | o-cresol | (g) | — | — | — |
| | β-naphthol | (g) | — | — | — |
| Paraformaldehyde | | (g) | 19.7 | 25.4 | 19.7 |
| Acid catalyst | | (g) | 2.7 | 1.3 | 1.3 |
| Reaction temperature | | (° C.) | 100 | 100 | 140 |
| Reaction time | | (min.) | 120 | 120 | 120 |
| Extraction conditions | | | | | |
| Used solvent | | — | Heavy naphtha | n-octane | Heavy naphtha |
| Amount of solvent | | (ml/Extraction times) | 160 | 400 | 320 |
| Stirring temperature | | (° C.) | 98 | 90 | 98 |
| Stirring time | | (min.) | 30 | 30 | 30 |
| Number of extraction | | (times) | 2 | 1 | 1 |
| Properties | | | | | |
| Yield (based on raw oil) | | % by weight | 76 | 92 | 51 |
| Retention of unreacted product | | (%) | 1.2 | 1.3 | 1.0 |
| Viscoscity at 150° C. (ICI viscometer) | | (p) | 2.0 | 3.8 | 1.5 |
| Number-average molecular weight | | — | 659 | 818 | 695 |
| Hydroxyl group equivalent | | (g/equivalent) | 128 | 130 | 135 |
| Heating weight loss | (105° C.) | % by weight | 0.11 | 0.09 | 0.12 |
| | (150° C.) | % by weight | 0.51 | 0.50 | 0.51 |

| | | | Ex. 65 | Ex. 66 | Ex. 67 | Comp. Ex. 1 |
|---|---|---|---|---|---|---|
| Reaction conditions | | | | | | |
| Raw oil | Petroleum raw oil B | (g) | 100 | 100 | 100 | 100 |
| | Petroleum raw oil X | (g) | — | — | — | — |
| | Coal tar S | (g) | — | — | — | — |
| Phenols | Phenol | (g) | 94 | — | — | 94 |
| | o-cresol | (g) | — | 114 | — | — |
| | β-naphthol | (g) | — | — | 100 | — |
| Paraformaldehyde | | (g) | 18.5 | 18.5 | 19.7 | 18.5 |
| Acid catalyst | | (g) | 2.5 | 2.8 | 2.7 | 2.5 |
| Reaction temperature | | (° C.) | 100 | 140 | 140 | 140 |
| Reaction time | | (min.) | 120 | 120 | 120 | 120 |

TABLE 14-continued

| Extraction conditions | | | | | |
|---|---|---|---|---|---|
| Used solvent | — | Kerosene | Heavy naphtha | Heavy naphtha | Heavy naptha |
| Amount of solvent | (ml/ Extraction times) | 320 | 350 | 400 | 3200 |
| Stirring temperature | (° C.) | 98 | 98 | 98 | — |
| Stirring time | (min.) | 30 | 30 | 30 | — |
| Number of extraction | (times) | 1 | 1 | 1 | — |
| Properties | | | | | |
| Yield (based on raw oil) | % by weight | 69 | 79 | 84 | 78 |
| Retention of unreacted product | (%) | 1.1 | 1.1 | 1.4 | 10.3 |
| Viscoscity at 150° C. (ICI viscometer) | (p) | 1.2 | 1.1 | 4.5 | 0.7 |
| Number-average molecular weight | — | 697 | 725 | 1024 | 439 |
| Hydroxyl group equivalent | (g/ equivalent) | 129 | 135 | 145 | 141 |
| Heating weight loss (105° C.) | % by weight | 0.11 | 0.07 | 0.12 | 2.09 |
| (150° C.) | % by weight | 0.42 | 0.44 | 0.52 | 4.21 |

*pbw: parts by weight

EXAMPLE 68

100 g (0.72 mol) of a raw oil P, 38.2 g (0.41 mol) of phenol and 9.1 g (0.30 mol) of paraformaldehyde were charged into a 1 liter glass reaction vessel, and the mixture was maintained at 40° C. while stirring at a rate of 250 to 350 rpm. After the temperature became stable, 1.5 g (0.012 mol) of oxalic acid was added. The mixture was heated to 140° C. over 30 minutes and the reaction was continued while stirring at the same temperature for 90 minutes to obtain a polycondensation reaction mixture.

To the reaction mixture, 120 ml of methyl isobutyl ketone was added to form a resin mixed solution. The resulting resin mixed solution was washed with 82 ml of distilled water to remove an acid remained in the resin mixed solution.

The resulting acid-removed resin mixed solution was concentrated by using an evaporator until the resin concentration became 60% by weight, and then introduced into a heavy naphtha to remove the unreacted raw oil remained in the resin solution.

The resulting crude highly reactive modified phenolic resin was subjected to vacuum distillation until phenol was not distilled from the resin, and then nitrogen was blown into the crude highly reactive modified phenolic resin at 155° C. after the removal of phenol to obtain 55.3 g of a highly reactive modified phenolic resin.

Properties of the resulting highly reactive modified phenolic resin are shown in Table 15, together with the reaction conditions.

EXAMPLE 69

100 g (0.72 mol) of a raw oil P, 115.1 g (1.22 mol) of phenol and 18.9 g (0.63 mol) of paraformaldehyde, 1.5 g (0.012 mol) of oxalic acid were charged into a 1 liter glass reaction vessel, and the mixture was maintained at 40° C. while stirring at a rate of 250 to 350 rpm. After the temperature became stable, 1.5 g (0.012 mol) of oxalic acid was further added. The mixture was heated to 100° C. over 20 minutes and the reaction was continued while stirring at the same temperature for 220 minutes to obtain a polycondensation reaction mixture.

The above reaction mixture was poured into a heavy naphtha to remove the unreacted raw material, thereby obtaining a crude highly reactive modified phenolic resin.

Nitrogen was blown into this crude highly reactive modified phenolic resin at 155° C. for 30 minutes to remove the unreacted phenol remained in the resin.

Then, the crude highly reactive modified phenolic resin after removing phenol was heated to 180° C. under a nitrogen atmosphere and, after maintaining for 1 hour, the resin was cooled to room temperature to obtain 83 g of a highly reactive modified phenolic resin.

Properties of the resulting highly reactive modified phenolic resin are shown in Table 15, together with the reaction conditions.

EXAMPLE 70

100 g (0.72 mol) of a raw oil P, 62.4 g (0.66 mol) of phenol and 12.0 g (0.63 mol) of paraformaldehyde were charged into a 1 liter glass reaction vessel, and the mixture was maintained at 40° C. while stirring at a rate of 250 to 350 rpm. After the temperature became stable, 0.75 g (0.006 mol) of oxalic acid was added. The mixture was heated to 90° C. over 20 minutes. Then, 0.75 g (0.006 mol) of oxalic acid was added, the mixture was heated to 100° C. over 10 minutes and the reaction was continued while stirring at the same temperature for 90 minutes to obtain a polycondensation reaction mixture.

The reaction mixture was poured into a heavy naphtha, followed by heating with stirring to remove the unreacted raw material, thereby obtaining a crude highly reactive modified phenolic resin.

The resulting crude highly reactive modified phenolic resin was subjected to steam distillation at 155° C. to remove the unreacted phenol remained in the resin.

Then, the crude highly reactive modified phenolic resin after removing phenol was heated to 180° C. under a nitrogen atmosphere and, after maintaining at the same temperature for 1 hour, the resin was cooled to room temperature to obtain 81.2 g of a highly reactive modified phenolic resin.

Properties of the resulting highly reactive modified phenolic resin are shown in Table 15, together with the reaction conditions.

EXAMPLE 71

100 g (0.68 mol) of a raw oil Q, 102.2 g (1.09 mol) of phenol and 19.6 g (0.65 mol) of paraformaldehyde were charged into a 1 liter glass reaction vessel, and the mixture was maintained at 40° C. while stirring at a rate of 250 to 350 rpm. After the temperature became stable, 1.6 g (0.013 mol) of oxalic acid was added. The mixture was heated to 100° C. over 20 minutes and the reaction was continued while stirring at the same temperature for 100 minutes to obtain a polycondensation reaction mixture.

To this reaction mixture, 170 ml of methanol was added to form a resin mixed solution. 170 ml of a heavy naphtha was added to the resulting resin mixed solution to remove the unreacted raw material remained in the resin mixed solution.

Then, methanol was distilled off from the resin mixed solution by using an evaporator to obtain a crude highly reactive modified phenolic resin. Nitrogen was blown into the resulting crude highly reactive modified phenolic resin at 155° C. for 30 minutes to remove the unreacted phenol remained in the resin.

Then, the crude highly reactive modified phenolic resin after removing phenol was heated to 180° C. under a nitrogen atmosphere and, after maintaining at the same temperature for 1 hour, the resin was cooled to room temperature to obtain 125.6 g of a highly reactive modified phenolic resin.

Properties of the resulting highly reactive modified phenolic resin are shown in Table 15, together with the reaction conditions.

EXAMPLE 72

100 g (0.68 mol) of a raw oil Q, 102.2 g (1.09 mol) of phenol, 19.6 g (0.65 mol) of paraformaldehyde and 3.2 g (0.025 mol) of oxalic acid were charged into a 1 liter glass reaction vessel, and the mixture was heated to 100° C. over 20 minutes while stirring at a rate of 250 to 350 rpm. Then, the reaction was continued while stirring at the same temperature for 100 minutes to obtain a polycondensation reaction mixture.

To the reaction mixture, 120 ml of methyl isobutyl ketone was added to form a resin mixed solution. The resulting resin mixed solution was washed with 82 ml of distilled water to remove an acid remained in the resin mixed solution.

Methyl isobutyl ketone was distilled off from the resulting acid-removed resin mixed solution by using an evaporator, and then 170 ml of acetonitrile was added to form a resin mixed solution again. To the resulting resin mixed solution, 170 ml of a heavy naphtha was added to remove the unreacted raw material remained in the resin mixed solution.

After acetonitrile was removed from this resin mixed solution by using an evaporator, the vacuum distillation was performed until phenol was not distilled to obtain a crude highly reactive modified phenolic resin.

The remained phenol was removed by blowing nitrogen into the resulting crude highly reactive modified phenolic resin at 55° C. to obtain 131.0 g of a highly reactive modified phenolic resin.

Properties of the resulting highly reactive modified phenolic resin are shown in Table 15, together with the reaction conditions.

EXAMPLE 73

100 g (0.68 mol) of a raw oil Q, 110.5 g (1.18 mol) of phenol and 0.8 g (0.06 mol) of oxalic acid were charged in a 1 liter glass reaction vessel, and the mixture was maintained at 40° C. while stirring at a rate of 250 to 350 rpm. After the temperature became stable, 8.5 g (0.28 mol) of paraformaldehyde was added and heating was started. After the temperature reached 70° C., 8.0 g (0.27 mol) of paraformaldehyde was further added and the temperature was raised to 90° C. After the temperature reached 90° C., 8.0 g (0.27 mol) of paraformaldehyde and 0.8 g (0.06 mol) of oxalic acid were added, the temperature was raised to 100° C., and then the reaction was continued while stirring at the same temperature for 100 minutes to obtain a reaction mixture.

The above reaction mixture was subjected to vacuum distillation until phenol was not distilled, and the unreacted phenol was removed by further blowing nitrogen at 155° C. to obtain a crude highly reactive modified phenolic resin.

The resulting crude highly reactive modified phenolic resin was introduced into a heavy naphtha to remove the unreacted raw material remained in the resin.

Then, the crude highly reactive modified phenolic resin after removing the unreacted raw material was heated to 180° C. under a nitrogen atmosphere and, after maintaining at the same temperature for 1 hour, the resin was cooled to room temperature to obtain 121 g of a highly reactive modified phenolic resin.

Properties of the resulting highly reactive modified phenolic resin are shown in Table 15, together with the reaction conditions.

EXAMPLE 74

100 g (0.61 mol) of a raw oil R, 108.6 g (1.16 mol) of phenol, 15.6 g (0.52 mol) of paraformaldehyde and 1.6 g (0.013 mol) of oxalic acid were charged into a 1 liter glass reaction vessel, and the mixture was heated to 100° C. over 20 minutes while stirring at a rate of 250 to 350 rpm. Then, the reaction was continued while stirring at the same temperature for 100 minutes to obtain a polycondensation reaction mixture.

170 ml of acetonitrile was introduced into the above reaction mixture to form a resin mixed solution, and then 170 ml of a heavy naphtha was added to the resulting resin mixed solution to remove the unreacted raw material remained in the resin mixed solution.

Acetonitrile was distilled off from the resulting resin mixed solution by using an evaporator to obtain a crude highly reactive modified phenolic resin.

Nitrogen was blown into the crude highly reactive modified phenolic resin at 155° C. for 30 minutes to remove the unreacted phenol remained in the resin.

Then, the crude highly reactive modified phenolic resin after removing phenol was heated to 180° C. under a nitrogen atmosphere and, after maintaining at the same temperature for 1 hour, the resin was cooled to room temperature to obtain 121 g of a highly reactive modified phenolic resin.

Properties of the resulting highly reactive modified phenolic resin are shown in Table 15, together with the reaction conditions.

EXAMPLE 75

100 g (0.61 mol) of a raw oil R, 125.4 g (1.33 mol) of phenol, 24 g (0.80 mol) of paraformaldehyde, 70.7 g of m-xylene and 1.6 g (0.008 mol) of paratoluenesulfonic acid were charged into a 1 liter glass reaction vessel, and the mixture was heated to 100° C. over 20 minutes while stirring at a rate of 250 to 350 rpm. Then, the reaction was continued while stirring at the same temperature for 100 minutes to obtain a polycondensation reaction mixture.

To this reaction mixture, 180 ml of methyl isobutyl ketone was added to form a resin mixed solution, and the resulting resin mixed solution was washed with 120 ml of distilled water to remove an acid remained in the resin.

The resulting acid-removed resin mixed solution was subjected to vacuum distillation until the unreacted phenol remained in methyl isobutyl ketone and resin was not distilled, and nitrogen was further blown at 155° C. to obtain a crude highly reactive modified phenolic resin.

The unreacted raw material remained in the highly reactive modified phenolic resin after removing phenol was removed by introducing the resin into a heavy naphtha, followed by heating with stirring to obtain 108 g of a highly reactive modified phenolic resin.

Properties of the resulting highly reactive modified phenolic resin are shown in Table 15, together with the reaction conditions.

EXAMPLE 76

100 g (0.61 mol) of a raw oil R, 45 g (0.48 mol) of phenol, 10 g (0.33 mol) of paraformaldehyde and 10 g (0.063 mol) of oxalic acid were charged into a 1 liter glass reaction vessel, and the mixture was heated to 100° C. over 20 minutes while stirring at a rate of 250 to 350 rpm. Then, the reaction was continued while stirring at the same temperature for 100 minutes to obtain a polycondensation reaction mixture.

The unreacted phenol remained in the resin was removed by blowing nitrogen into the above reaction mixture at 155° C. over 30 minutes to obtain a crude highly reactive modified phenolic resin.

To the crude highly reactive modified phenolic resin after removing phenol, 170 ml of dimethyl sulfoxide was added to form a resin mixed solution. To the resulting resin mixed solution, 170 ml of a heavy naphtha was added to remove the unreacted raw material remained in the resin mixed solution.

Then, the resin mixed solution was subjected to vacuum distillation until dimethyl sulfoxide was not distilled and heated to 180° C. under a nitrogen atmosphere. After maintaining at the same temperature for 1 hour, the resulting solution was cooled to room temperature to obtain 55 g of a highly reactive modified phenolic resin.

Properties of the resulting highly reactive modified phenolic resin are shown in Table 15, together with the reaction conditions.

EXAMPLE 77

100 g (0.61 mol) of a raw oil R, 263 g (2.80 mol) of phenol, 63 g (2.10 mol) of paraformaldehyde and 18.8 g of an acidic ion exchange resin Daiya-ion SK1B (manufactured by Mitsubishi Chemical Co., Ltd.) were charged in a 1 liter glass reaction vessel, and the mixture was heated to 100° C. over 20 minutes while stirring at a rate of 250 to 350 rpm. Then, the reaction was continued while stirring at the same temperature for 100 minutes to obtain a polycondensation reaction mixture.

To the reaction mixture, 340 ml of methyl isobutyl ketone was added to form a resin mixed solution. The resulting resin mixed solution was filtered by using a metal mesh of 60 mesh to remove the used ion exchange resin.

The resulting acid-removed resin mixed solution was concentrated by using an evaporator until the resin concentration became 60% by weight, and then introduced into a heavy naphtha to remove the unreacted raw material remained in the resin.

Then, the resulting crude highly reactive modified phenolic resin was subjected to vacuum distillation until the remained unreacted phenol was not distilled and nitrogen was further blown at 155° C. to obtain 143 g of a highly reactive modified phenolic resin.

Properties of the resulting highly reactive modified phenolic resin are shown in Table 15, together with the reaction conditions.

EXAMPLES 78 TO 87

Curing accelerator-containing resin mixtures, compounds and molded articles were produced in the same manner as in Example 8, except that the highly reactive modified phenolic resins obtained in Examples 68 to 77 and an epoxy resin (trade name: EOCN1020 YX-4000H) were used.

The compositions, properties, etc. are shown in Table 16.

TABLE 15

|  |  | Ex. 68 | Ex. 69 | Ex. 70 |
|---|---|---|---|---|
| Kind of raw material | — | Raw oil P | Raw oil P | Raw oil P |
| Raw material | (g) | 100.0 | 100.0 | 100.0 |
| Phenol | (g) | 38.2 | 115.1 | 62.4 |
| Formaldehyde compound | (g) | 9.1 | 18.9 | 12.0 |
| Aromatic hydrocarbon compound | (g) | — | — | — |
| Acid catalyst | (g) | 1.5 | 3.0 | 1.5 |
| Kind of acid catalyst | — | Oxalic acid | Oxalic acid | Oxalic acid |
| Reaction temperature | (° C.) | 140 | 100 | 100 |
| Reaction time | (min.) | 120 | 240 | 120 |
| Yield (based on raw oil) | (wt %) | 55.3 | 83.0 | 81.2 |
| Hydroxy group equivalent | (g/eq) | 170 | 140 | 138 |
| Viscosity at 150° C. (ICI Viscometer) | (p) | 9.5 | 0.4 | 1.9 |
| Number-average molecular weight | — | 810 | 720 | 715 |

|  |  | Ex. 71 | Ex. 72 | Ex. 73 |
|---|---|---|---|---|
| Kind of raw material | — | Raw oil Q | Raw oil Q | Raw oil Q |
| Raw material | (g) | 100.0 | 100.0 | 100.0 |
| Phenol | (g) | 102.2 | 102.2 | 110.5 |
| Formaldehyde compound | (g) | 19.6 | 19.6 | 24.5 |
| Aromatic hydrocarbon compound | (g) | — | — | — |
| Acid catalyst | (g) | 1.6 | 3.2 | 1.6 |
| Kind of acid catalyst | — | Oxalic acid | Oxalic acid | Oxalic acid |
| Reaction temperature | (° C.) | 100 | 100 | 100 |
| Reaction time | (min.) | 120 | 120 | 120 |
| Yield (based on raw oil) | (wt %) | 125.6 | 131.0 | 121.0 |
| Hydroxy group equivalent | (g/eq) | 140 | 144 | 138 |
| Viscosity at 150° C. (ICI Viscometer) | (p) | 2.6 | 2.7 | 2.5 |
| Number-average molecular weight | — | 730 | 726 | 701 |

|  |  | Ex. 74 | Ex. 75 | Ex. 76 | Ex. 77 |
|---|---|---|---|---|---|
| Kind of raw material | — | Raw oil R | Raw oil R | Raw oil R | Raw oil R |
| Raw material | (g) | 100.0 | 100.0 | 100.0 | 100.0 |
| Phenol | (g) | 108.6 | 125.4 | 45.0 | 263.0 |
| Formaldehyde compound | (g) | 15.6 | 24.0 | 10.0 | 63.0 |
| Aromatic hydrocarbon compound | (g) | — | 70.7 | — | — |
| Acid catalyst | (g) | 1.6 | 1.6 | 8.0 | 18.8 |
| Kind of acid catalyst | — | Oxalic acid | PTS | Oxalic acid | Solid acid |
| Reaction temperature | (° C.) | 100 | 100 | 100 | 100 |
| Reaction time | (min.) | 120 | 120 | 120 | 120 |
| Yield (based on raw oil) | (wt %) | 121.0 | 108.0 | 55.0 | 143.0 |
| Hydroxy grouop equivalent | (g/eq) | 135 | 128 | 133 | 196 |
| Viscosity at 150° C. (ICI Viscometer) | (p) | 0.2 | 4.0 | 8.0 | 9.6 |
| Number-average molecular weight | — | 681 | 727 | 773 | 803 |

TABLE 16

|  |  |  | Ex. 78 | Ex. 79 | Ex. 80 |
|---|---|---|---|---|---|
| Modified phenolic resin | Example 68 | pbw | 11.25 | | |
| | Example 69 | pbw | | 10.09 | |
| | Example 70 | pbw | | | 9.97 |
| | Example 71 | pbw | | | |
| | Example 72 | pbw | | | |
| | Example 73 | pbw | | | |
| | Example 74 | pbw | | | |
| | Example 75 | pbw | | | |
| | Example 76 | pbw | | | |
| | Example 77 | pbw | | | |
| Epoxy resin | YX-4000H | pbw | | | 14.09 |
| | EOCN-1020 | pbw | 13.05 | 14.21 | |
| Curing accelelator | TPP | pbw | 0.25 | 0.25 | 0.49 |
| Fused silica | CRS1102-GT200T | pbw | 75.00 | 75.00 | 75.00 |
| Carnauba wax | | pbw | 0.25 | 0.25 | 0.25 |
| Carbon black | | pbw | 0.20 | 0.20 | 0.20 |
| Gelation time | | (170° C./SEC) | 47 | 42 | 39 |
| Shore hardness immediately after molding | | — | 74 | 72 | 75 |
| Glass transition temperature (Tg) | | (° C.) | 165 | 158 | 160 |
| Flexural strength | Room temperature | (kgf/mm²) | 16.8 | 15.9 | 16.1 |
| Flexural modulus | Room temperature | (kgf/mm²) | 1850 | 1820 | 1830 |
| Moisture absorption rate | 85° C./85%-72 hr | (wt %) | 0.26 | 0.25 | 0.27 |
| | 85° C./85%-168 hr | (wt %) | 0.38 | 0.35 | 0.39 |

|  |  |  | Ex. 81 | Ex. 82 | Ex. 83 |
|---|---|---|---|---|---|
| Modified phenolic resin | Example 68 | pbw | | | |
| | Example 69 | pbw | | | |
| | Example 70 | | | | |
| | Example 71 | pbw | 10.06 | | |
| | Example 72 | pbw | | 10.22 | |
| | Example 73 | pbw | | | 10.01 |
| | Example 74 | pbw | | | |
| | Example 75 | pbw | | | |
| | Example 76 | pbw | | | |
| | Example 77 | pbw | | | |
| Epoxy resin | YX-4000H | pbw | 14.00 | 13.84 | |
| | EOCN-1020 | pbw | | | 14.29 |
| Curing accelerator | TPP | pbw | 0.49 | 0.49 | 0.25 |
| Fused silica | CRS1102-GT200T | pbw | 75.00 | 75.00 | 75.00 |
| Carnauba wax | | pbw | 0.25 | 0.25 | 0.25 |
| Carbon black | | pbw | 0.20 | 0.20 | 0.20 |
| Gelation time | | (170° C./SEC) | 41 | 43 | 38 |
| Shore hardness immediately after molding | | — | 76 | 78 | 73 |
| Glass transition temperature (Tg) | | (° C.) | 162 | 160 | 162 |
| Flexural strength | Room temperature | (kgf/mm²) | 16.5 | 17.2 | 17.4 |
| Flexural modulus | Room temperature | (kgf/mm²) | 1850 | 1880 | 1890 |
| Moisture absorption rate | 85° C./85%-72 hr | (wt %) | 0.28 | 0.25 | 0.25 |
| | 85° C./85%-168 hr | (wt %) | 0.40 | 0.34 | 0.36 |

|  |  |  | Ex. 84 | Ex. 85 | Ex. 86 | Ex. 87 |
|---|---|---|---|---|---|---|
| Modified phenolic resin | Example 68 | pbw | | | | |
| | Example 69 | pbw | | | | |
| | Example 70 | pbw | | | | |
| | Example 71 | pbw | | | | |
| | Example 72 | pbw | | | | |
| | Example 73 | pbw | | | | |
| | Example 74 | pbw | 9.88 | | | |
| | Example 75 | pbw | | 9.57 | | |
| | Example 76 | pbw | | | 9.76 | |
| | Example 77 | pbw | | | | 12.06 |
| Epoxy resin | YX-4000H | pbw | | | 14.30 | 12.00 |
| | EOCN-1020 | pbw | 14.42 | 14.73 | | |
| Curing accelerator | TPP | pbw | 0.25 | 0.25 | 0.49 | 0.49 |
| Fused silica | CRS1102-GT200T | pbw | 75.00 | 75.00 | 75.00 | 75.00 |
| Carnauba wax | | pbw | 0.25 | 0.25 | 0.25 | 0.25 |
| Carbon black | | pbw | 0.20 | 0.20 | 0.20 | 0.20 |
| Gelation time | | (170° C./SEC) | 38 | 36 | 38 | 50 |
| Shore hardness immediately after molding | | — | 76 | 75 | 77 | 75 |
| Glass transition temperature (Tg) | | (° C.) | 156 | 161 | 165 | 166 |
| Flexural strength | Room temperature | (kgf/mm²) | 15.7 | 16.3 | 17.1 | 17.3 |
| Flexural modulus | Room temperature | (kgf/mm²) | 1820 | 1850 | 1860 | 1880 |
| Moisture absorption rate | 85° C./85%-72 hr | (wt %) | 0.26 | 0.27 | 0.27 | 0.25 |
| | 85° C./85%-168 hr | (wt %) | 0.37 | 0.36 | 0.35 | 0.36 |

*pbw: parts by weight

What is claimed is:

1. A modified phenolic resin molding material comprising a highly reactive modified phenolic resin and an epoxy resin, wherein said phenolic resin is prepared in a one-step process which comprises mixing a petroleum heavy oil or pitch with 0.3 to 10 mol of a phenol, 0.2 to 9 mol, in terms of formaldehyde, of a formaldehyde compound and 0.01 and 3.0 mol of an acid catalyst, each amount being based on 1 mol of the petroleum heavy oil or pitch calculated from an average molecular weight; and heating the resulting mixture with stirring, thereby to polycondensate the petroleum heavy oil or pitch, phenol and formaldehyde compound.

2. The molding material according to claim 1, wherein the phenol, formaldehyde compound and acid catalyst are respectively used in the amount of 1 to 10 mol. 0.5 to 9 mol and 0.05 to 3.0 mol. based on 1 mol, of the petroleum heavy oil or pitch calculated from the average molecular weight.

3. A material for electrical/electronic parts, which is obtained by molding the modified phenolic resin molding material of claim 1.

4. A semiconductor sealing material comprising the modified phenolic resin molding material of claim 1.

5. A modified phenolic resin molding material comprising a highly reactive modified phenolic resin and an epoxy resin, wherein said phenolic resin is prepared by a process comprising:

mixing a heavy oil or pitch with a phenol, followed by heating them with stirring; and adding gradually an acid catalyst and 1 mol or less, in terms of formaldehyde, of a formaldehyde compound based on 1 mol of the phenol to the mixture while heating with stirring, thereby to polycondensate the heavy oil or pitch, phenol and formaldehyde compound.

6. A modified phenolic resin molding material comprising a highly reactive modified phenolic resin and an epoxy resin wherein said phenolic resin is prepared by a process comprising:

mixing a heavy oil or pitch, a phenol and 1 mol or less, in terms of formaldehyde, of a formaldehyde compound based on 1 mol of the phenol, followed by heating them with stirring; and adding gradually an acid catalyst to the mixture while heating with stirring, thereby to polycondensate the heavy oil or pitch, phenol and formaldehyde compound.

7. A modified phenolic resin molding material comprising a highly reactive modified phenolic resin and an epoxy resin wherein said phenolic resin is prepared by a process comprising:

mixing a heavy oil or pitch, a phenol and an acid catalyst, followed by heating them with stirring; and adding gradually 1 mol or less, in terms of formaldehyde, of a formaldehyde compound based on 1 mold of the phenol to the mixture while heating with stirring, thereby to polycondensate the heavy oil or pitch, phenol and formaldehyde compound.

8. A modified phenolic resin molding material comprising a highly reactive modified phenolic resin and an epoxy resin wherein said phenolic resin is prepared by a process comprising:

mixing a heavy oil or pitch with an acid catalyst, followed by heating them with stirring; and adding gradually 1 mol or less, in terms of formaldehyde, of a formaldehyde compound based on 1 mol of the phenol, and a phenol to the mixture while heating with stirring, thereby to polycondensate the heavy oil or pitch, phenol and formaldehyde compound.

9. A modified phenolic resin molding material comprising a highly reactive modified phenolic resin and an epoxy resin wherein said phenolic resin is prepared by a process comprising:

mixing 1 mol or less, in terms of formaldehyde, of a formaldehyde compound based on 1 mol of a phenol with an acid catalyst, followed by heating them with stirring; and adding gradually a heavy oil or pitch and the phenol to the mixture while heating with stirring, thereby polycondensate the heavy oil or pitch, phenol and formaldehyde compound.

10. A modified phenolic resin molding material comprising a highly reactive modified phenolic resin and an epoxy resin wherein said phenolic resin is prepared by a one-step process comprising:

mixing a coal-based heavy oil or pitch with 0.3 to 4.6 mol of a phenol, 0.2 to 3.5 mol, in terms of formaldehyde, of a formaldehyde compound and 0.01 to 3.0 mol of an acid catalyst, each amount being based on 1 mol of the coal-based heavy oil or pitch calculated from an average molecular weight; and heating the resulting mixture with stirring, thereby to polycondensate the coal-based heavy oil or pitch, phenol and formaldehyde compound.

11. The molding material according to claim 5, wherein a part of the formaldehyde compound is previously added to the mixture and the remainder is gradually added.

12. The molding material according to any one of claims 5 to 10, wherein the heavy oil or pitch is a petroleum heavy oil or pitch.

13. The molding material according to any one of claims 5 to 10, wherein the heavy oil or pitch is a distilled oil which is obtained in a catalytic cracking step or a thermal cracking step of a petroleum refining process and which has a true boiling point of 180 to 500° C., an aromatic hydrocarbon fraction fa value of 0.40 to 0.95 and an aromatic ring hydrogen content Ha value of 20 to 80%.

14. The molding material according to any one of claims 5 to 10, wherein an aromatic hydrocarbon compound is used as a raw material, in addition to the heavy oil or pitch.

15. The molding material according to any one of claims 5 to 10, wherein the acid catalyst is a Bronsted acid selected from the group consisting of organic acid, inorganic acid and solid acid.

16. The molding material according to any one of claims 5 to 10, wherein the acid catalyst is an acidic cation exchange resin.

17. The molding material according to any one of claims 5 to 10, wherein the heavy oil or pitch is used after subjecting to a paraffin fraction removing treatment.

18. The molding material according to any one of claims 5 to 10, wherein the highly reactive modified phenolic resin obtained by the polycondensation reaction is purified by at least one step selected from the group consisting of:

(i) a step of removing an unreacted component from a reaction mixture by at least one treatment selected from the group consisting of a treatment of bringing the reaction mixture containing the highly reactive modified phenolic resin into contact with an extraction solvent containing at least one compound selected from the group consisting of an aliphatic hydrocarbon, an alicyclic hydrocarbon and an aliphatic petroleum fraction at a temperature where the polycondensated reaction mixture becomes a flow state; a treatment of diluting the reaction mixture containing the highly reactive modified phenolic resin with a soluble solvent to prepare a solution and introducing the solution into a solvent containing at least one compound selected from the group consisting of an aliphatic hydrocarbon having 10 or less carbon atoms, an alicyclic hydrocarbon having 10 or less carbon atoms and an aliphatic petroleum fraction; a treatment of diluting the reaction mixture with a soluble solvent to prepare a solution and bringing the resulting solution into contact with an extraction solvent which forms a liquid-liquid two-layer solvent system with this solution containing the highly reactive modified phenolic resin and can dissolve an unreacted component; a treatment of standing the reaction mixture in a heat-molten state and removing the supernatant by decantation: a treatment of performing molecular distillation of the reaction mixture under high vacuum of $10^{-7}$ to $10^{-4}$ mmHg; and a treatment of diluting the reaction mixture with a soluble solvent to prepare a solution, mixing the resulting solution with water, standing to form a three-layer solvent system consisting of a highly reactive modified phenolic resin solution layer, an aqueous layer and an unreacted oil layer in order from the bottom and removing the aqueous layer and unreacted oil layer;

(ii) a step of removing a catalyst residue; and (iii) a step of removing the remained phenol by any one of steam distillation, blowing of a nitrogen gas and vacuum distillation.

* * * * *